United States Patent
Filonov et al.

(10) Patent No.: US 11,194,848 B2
(45) Date of Patent: Dec. 7, 2021

(54) METHOD OF AND SYSTEM FOR BUILDING SEARCH INDEX USING MACHINE LEARNING ALGORITHM

(71) Applicant: YANDEX EUROPE AG, Lucerne (CH)

(72) Inventors: Yegor Andreevich Filonov, Ozersk (RU); Ivan Vladimirovich Korostelev, Moscow (RU); Yaroslav Victorovich Akulov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 204 days.

(21) Appl. No.: 16/503,547

(22) Filed: Jul. 4, 2019

(65) Prior Publication Data
US 2020/0192920 A1 Jun. 18, 2020

(30) Foreign Application Priority Data
Dec. 13, 2018 (RU) .......................... RU2018144175

(51) Int. Cl.
*G06F 16/31* (2019.01)
*G06F 16/93* (2019.01)
(Continued)

(52) U.S. Cl.
CPC ........ *G06F 16/313* (2019.01); *G06F 16/2228* (2019.01); *G06F 16/35* (2019.01);
(Continued)

(58) Field of Classification Search
CPC .................................................... G06F 16/313
See application file for complete search history.

(56) References Cited

U.S. PATENT DOCUMENTS 8,244,722 B1 8/2012 Koningstein
8,898,152 B1 11/2014 Ie et al.
(Continued)

FOREIGN PATENT DOCUMENTS

RU          2474870 C1      2/2013

OTHER PUBLICATIONS

Burges, Christopher. (2010). From ranknet to lambdarank to lambdamart: An overview. Learning. (Year: 2010).*
(Continued)

*Primary Examiner* — Brittany N Allen
(74) *Attorney, Agent, or Firm* — BCF LLP

(57) ABSTRACT

A method and system for selecting documents for inclusion into a search engine search index executed by a machine learning algorithm (MLA) comprising: acquiring a plurality of digital documents, each respective document having a respective size, determining a respective value parameter based on user interactions, ranking the digital documents to obtain a ranked list of documents based on: a respective quality value parameter based on the respective value parameter and the respective size, the ranking being performed such that a cumulative quality value parameter is maximized based on: the quality value parameter of a given digital document is weighted by a sum of the sizes of a given subset of documents, wherein the given subset consists of documents having a respective value parameter below the value parameter of the given digital document, selecting a subset from the ranked list and storing the subset in the search index.

22 Claims, 8 Drawing Sheets

(51) Int. Cl.
  *G06N 20/20* (2019.01)
  *G06F 16/35* (2019.01)
  *G06K 9/62* (2006.01)
  *G06F 16/951* (2019.01)
  *G06F 16/22* (2019.01)
  *G06N 20/00* (2019.01)

(52) U.S. Cl.
  CPC ............ *G06F 16/93* (2019.01); *G06F 16/951* (2019.01); *G06K 9/623* (2013.01); *G06N 20/00* (2019.01); *G06N 20/20* (2019.01)

(56) References Cited

U.S. PATENT DOCUMENTS

| | | |
|---|---|---|
| 2003/0055831 A1 | 3/2003 | Ryan et al. |
| 2004/0133564 A1 | 7/2004 | Gross et al. |
| 2006/0047643 A1 | 3/2006 | Chaman |
| 2007/0043723 A1 | 2/2007 | Bitan et al. |
| 2011/0264609 A1* | 10/2011 | Liu .................. G06N 20/00 706/12 |
| 2012/0143792 A1 | 6/2012 | Wang et al. |
| 2014/0105488 A1 | 4/2014 | Geng et al. |
| 2016/0283537 A1* | 9/2016 | Chen .................. G06F 16/2272 |
| 2017/0004159 A1 | 1/2017 | Voleti et al. |
| 2018/0285694 A1* | 10/2018 | Kobayashi ........... G06K 9/6215 |
| 2020/0097858 A1* | 3/2020 | Baikalov ............... G06K 9/623 |

OTHER PUBLICATIONS

Trevisiol, Learning to (Retrieve and) Rank—Intuitive Overview—part III, Apr. 4, 2017. (Year: 2017).*

Search Report received with regard to the counterpart RU Patent Application No. 2018144175 completed Mar. 24, 2020.

Krause et al., "Submodular Function Maximization", Published in Tractability, 2014, 28 pages.

* cited by examiner

METHOD OF AND SYSTEM FOR BUILDING SEARCH INDEX USING MACHINE LEARNING ALGORITHM

CROSS-REFERENCE

The present application claims priority from Russian Patent Application No. 2018144175, filed Dec. 13, 2018, entitled "Method of and System for Building Search Index Using Machine Learning Algorithm," the entirety of which is incorporated herein by reference.

FIELD

The present technology relates to information retrieval in general and, more specifically, to a method and a system for building a search index using a machine learning algorithm.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Generally speaking, a given user can access a resource on the communication network by two principle means. The given user can access a particular resource directly, either by typing an address of the resource (typically an URL or Universal Resource Locator or by clicking a link in an electronic message or in another web resource. Alternatively, the given user may conduct a search using a search engine to locate a resource of interest. The latter is particularly suitable in those circumstances, where the given user knows a topic of interest, but does not know the exact address of the resource she is interested in.

Briefly speaking, a search engine generally operates in three phases: web crawling, indexing, and searching. During the web crawling phase, the search engine executes a plurality of web crawlers or "spiders", which are computer programs that "crawl" or browse the World Wide Web (Web) and download copies of digital documents such as web pages, which are stored in a storage medium. During the indexing phase, the stored digital documents are processed to extract information, and the extracted information is used for building a search index. The search index stores the processed information in a suitable format for allowing fast retrieval. Typically, the digital documents are indexed according to some or all of the terms contained in the digital document, which terms can potentially "meet" one or more future search query terms. A so-called inverted index of the data collection is maintained and updated by the system, to be then used in execution of a given search query. The inverted index comprises a plurality of "posting lists", where every posting list corresponds to a term and contains references to data items comprising that search term.

During the searching phase, a user typically enters and submits a search query in a field on the search engine, the search engine retrieves digital documents relevant to the search terms included in the search query from the search index, and a machine learning algorithm (MLA) typically ranks the digital documents based on their computed relevancy to the terms of the search query. The ranked digital documents are then provided to the user in a search engine results pages (SERPs).

United States Patent Publication No. 2014/105488 A1 published on Apr. 17, 2014 to Microsoft Corp. and titled "Learning-based image page index selection" teaches architecture that performs image page index selection. A learning-based framework learns a statistical model based on the hyperlink (URL-uniform resource locator) previous click information obtained from the image search users. The learned model can combine the features of a newly discovered URL to predict the possibility of the newly-discovered URL being clicked in the future image search. In addition to existing web index selection features, image clicks are added as features, and the image clicks are aggregated over different URL segments, as well as the site modeling pattern trees to reduce the sparse problem of the image click information.

United States Patent Publication No. 2012/0143792 A1 published on Jun. 7, 2012 to Microsoft Corp. and titled "Page selection for indexing" teaches techniques for selecting web pages for inclusion in an index. For example, some implementations apply regularization to select a subset of the crawled web pages for indexing based on link relationships between the crawled web pages, features extracted from the crawled web pages, and user behavior information determined for at least some of the crawled web pages. Further, in some implementations, the user behavior information may be used to sort a training set of crawled web pages into a plurality of labeled groups. The labeled groups may be represented in a directed graph that indicates relative priorities for being selected for indexing.

United States Patent Publication No. 2017/0004159 A1 published on Jan. 5, 2017 to eBay inc. and titled "Search engine optimization by selective indexing" teaches a system and methods for identifying valuable view item pages for search engine optimization. The system and methods provide an improvement over existing systems, which do nothing to identify or select valuable view item pages for use in driving traffic from display sites. The system and methods improve the earlier system by predicting the probability of future traffic for a given product based on a number of product level factors as input variables, and identifying a selection of view item pages corresponding to the products with the probability of the highest future traffic in order to maximize the driving natural search traffic to a linked site of the corresponding view item page.

SUMMARY

It is an object of the present technology to ameliorate at least some of the inconveniences present in the prior art.

The number of pages on the Web is growing exponentially, and it is estimated that there are more than tens of trillions of documents available on the Web at the moment. Generally, only a segment of the available documents on the Web are indexed by search engines, as a majority of the documents are in the "Deep Web" and/or are not indexed for various reasons. Nonetheless, web crawlers need to crawl and save billions of documents, where only a portion of the saved documents are processed and indexed, as processing and indexing the documents for building a search index is a computationally expensive task due to, among other factors, a trade-off between the constant growth of the number of documents on the Web, and the computational capacity that is required to process and store the documents by the search engine datacenters.

Developers of the present technology have appreciated that not all documents indexed in the search index are of equal value in term of their "usefulness" to the search engine, as some documents may appear more often, may receive more user interactions and may be generally more relevant than others in response to search queries from users. Developers of the present technology have also appreciated that some documents may be rarely or never shown to users as search results in response to search queries, due to a variety of reasons, such as their low relevancy to the queries, low interest from users to look up information contained therein, and the like. Hence, developers have recognized that since the "usefulness" of the documents included in the search index may vary, there may be little to no advantage in keeping documents in the search index that may rarely be shown to users, as processing and indexing such documents may consume computational resources unnecessarily.

As a non-limiting example, with reference to FIG. 1, there is depicted a schematic representation of a distribution 10 of a number of documents available in a search index of a search engine server with respect to a number of times the documents were shown to users. The distribution 10 illustrates that there is a high number of documents in the search index of the search engine server that have been rarely shown to users, and a little number of documents that have been shown more frequently to users of the search engine server.

Consequently, developers of the present technology had a desire to address such problems.

Without wishing to be bound by any theory, developers of the present technology have acknowledged that an overall "quality" value of a set of documents selected for inclusion in the search index of search engine could be maximized, while taking into account an individual usefulness value of each document, the individual sizes of the documents, as well as a size limit of the search index.

Developers of the present technology have appreciated that such an approach may be challenging, as a balance must be kept between processing and indexing many documents having a smaller size and little to average usefulness values, and fewer documents having large sizes and higher usefulness values, while also considering other factors, such as the satisfaction of the users of the search engine.

Thus, embodiments of the present technology are directed to a method and a system for building a search index using a machine learning algorithm.

It is contemplated that the system as envisaged by the developers of the present technology may allow managing the limited amount of processing power and storage that can be allocated for indexation by selectively indexing documents in the search index of the search engine. Further, the present technology may also allow saving storage resources, bandwidth, and computational time, while providing more satisfactory results in response to user queries, as more "useful" documents could be inserted in the search index for a same index total size, compared to prior approaches.

According to a first broad aspect of the present technology, there is provided a computer-implemented method for selecting documents for inclusion into a search index of a search engine, the search engine implemented by a server, the server executing a machine learning algorithm (MLA), the MLA having been trained to rank documents based on size and user interactions with the documents, the method executable by the server, the method comprising: acquiring, by the server, a plurality of digital documents, each respective document of the plurality of digital documents having a respective size, determining, by the server, for each respective document of the plurality of digital documents, a respective value parameter based on user interactions with the respective document, the respective value parameter being indicative of a usefulness of the respective document to the search engine as a search result document, ranking, by the MLA, the plurality of digital documents to obtain a ranked list of documents, the ranking being based on: a respective quality value parameter of the respective document, the respective quality value parameter being based on the respective value parameter and the respective size of the respective document, the ranking being performed such that a cumulative quality value parameter is maximized based on: the quality value parameter of a given digital document of the ranked list of documents is weighted by a sum of the sizes of a given subset of documents of the plurality of digital documents, wherein the given subset of document consists of documents having a respective value parameter below the value parameter of the given digital document in the plurality of digital documents, selecting, by the MLA, a subset of documents from the ranked list of documents based on the quality value parameter of each respective document of the subset of documents, and storing, by the server, the subset of documents in the search index.

In some embodiments of the method, the given subset consists of all documents having a respective value parameter below the value parameter of the given digital document.

In some embodiments of the method, the user interactions are at least one of: predicted user interactions with the respective document, and past user interactions with the respective document.

In some embodiments of the method, a rank of a respective document in the ranked list of documents is based at least partially on a ratio of the respective value parameter to the respective size of the respective document.

In some embodiments of the method, the selecting is further based on: a sum of the respective sizes of the documents in the subset of documents being below a predetermined threshold size.

In some embodiments of the method, the predetermined threshold size is an available storage size of the search index of the search engine.

In some embodiments of the method, the subset of documents selected from the ranked list of documents comprises a number of O top ranked documents that fit within the search index of the search engine.

In some embodiments of the method, the MLA has been trained to rank documents using a LambdaMART algorithm.

In some embodiments of the method, the MLA has been trained to rank documents using a listwise ranking algorithm.

In some embodiments of the method, the ranking comprises maximizing the cumulative quality value parameter based on:

$$Q_m = \sum_i^N \left( q_i \cdot \sum_j^M s_j \right), p_j < p_i$$

wherein: Q is the cumulative quality value parameter, $q_i$ is the respective value parameter of the respective $i^{th}$ document in the plurality of digital documents, $s_j$ is the respective size of the respective $j^{th}$ document in the subset of documents, $p_i$ is the respective quality value parameter of the $i^{th}$ document in the plurality of digital documents, $p_j$ is the respective quality value parameter of the $j^{th}$ document in the plurality of digital documents N is a number of documents in the plurality of digital documents, and M is a number of documents in the given subset of documents.

In some embodiments of the method, the ranking comprises maximizing the cumulative quality value parameter based on:

$$Q_m = \sum_i^N \left( w_i \cdot q_i \cdot \sum_j^M w_j \cdot s_j \right), p_j < p_i$$

wherein: $Q_m$ is the cumulative quality value parameter, $w_i$ is a respective weight associated with the respective value parameter, $q_i$ is the respective value parameter of the respective $i^{th}$ in the plurality of digital documents, $w_j$ is a respective weight associated with the respective size, $s_j$ is the respective size of the respective $j^{th}$ document in the subset of documents, $p_i$ is the respective quality value parameter of the $i^{th}$ document in the plurality of digital documents, $p_j$ is the respective quality value parameter of the $j^{th}$ document in the plurality of digital documents N is a number of documents in the plurality of digital documents, and M is a number of documents in the given subset of documents.

In some embodiments of the method, the computing the respective value parameter of the respective document is performed using a second MLA executed by the server.

According to another broad aspect of the present technology, there is provided a system for selecting documents for inclusion into a search index of a search engine, the search engine implemented by the system, the system executing a machine learning algorithm (MLA), the MLA having been trained to rank documents based on size and user interactions with the documents, the system comprising: a processor, a non-transitory computer-readable medium comprising instructions, the processor, upon executing the instructions, being configured to: acquire a plurality of digital documents, each respective document of the plurality of digital documents having a respective size, determine for each respective document of the plurality of digital documents, a respective value parameter based on user interactions with the respective document, the respective value parameter being indicative of a usefulness of the respective document to the search engine as a search result document, rank, by the MLA, the plurality of digital documents to obtain a ranked list of documents, the ranking being based on: a respective quality value parameter of the respective document, the respective quality value parameter being based on the respective value parameter and the respective size of the respective document, the ranking being performed such that a cumulative quality value parameter is maximized based on: the quality value parameter of a given digital document of the ranked list of documents is weighted by a sum of the sizes of a given subset of documents of the plurality of digital documents, wherein the given subset of document consists of documents having a respective value parameter below the value parameter of the given digital document in the plurality of digital documents, select, by the MLA, a subset of documents from the ranked list of documents based on the quality value parameter of each respective document of the subset of documents, and store the subset of documents in the search index.

In some embodiments of the system, the given subset consists of all documents having a respective value parameter below the value parameter of the given digital document.

In some embodiments of the system, the user interactions are at least one of: predicted user interactions with the respective document, and past user interactions with the respective document.

In some embodiments of the system, a rank of a respective document in the ranked list of documents is based at least partially on a ratio of the respective value parameter to the respective size of the respective document.

In some embodiments of the system, the selecting is further based on: a sum of the respective sizes of the documents in the subset of documents being below a predetermined threshold size.

In some embodiments of the system, the predetermined threshold size is an available storage size of the search index of the search engine.

In some embodiments of the system, the subset of documents selected from the ranked list of documents comprises a number of O top ranked documents that fit within the search index of the search engine.

In some embodiments of the system, the MLA has been trained to rank documents using a LambdaMART algorithm.

In some embodiments of the system, the MLA has been trained to rank documents using a listwise ranking algorithm.

In some embodiments of the system, the ranking comprises maximizing the cumulative quality value parameter based on:

$$Q_m = \sum_i^N \left( q_i \cdot \sum_j^M s_j \right), p_j < p_i$$

wherein: Q is the cumulative quality value parameter, $q_i$ is the respective value parameter of the respective $i^{th}$ document in the plurality of digital documents, $s_j$ is the respective size of the respective $j^{th}$ document in the subset of documents, $p_i$ is the respective quality value parameter of the $i^{th}$ document in the plurality of digital documents, $p_j$ is the respective quality value parameter of the $j^{th}$ document in the plurality of digital documents N is a number of documents in the plurality of digital documents, and M is a number of documents in the given subset of documents.

In some embodiments of the system, the ranking comprises maximizing the cumulative quality value parameter based on:

$$Q_m = \sum_i^N \left( w_i \cdot q_i \cdot \sum_j^M w_j \cdot s_j \right), p_j < p_i$$

wherein: $Q_m$ is the cumulative quality value parameter, $w_i$ is a respective weight associated with the respective value parameter, $q_i$ is the respective value parameter of the respective $i^{th}$ in the plurality of digital documents, $w_j$ is a respective weight associated with the respective size, $s_j$ is the respective size of the respective $j^{th}$ document in the subset of documents, $p_i$ is the respective quality value parameter of the $i^{th}$ document in the plurality of digital documents, $p_j$ is the respective quality value parameter of the $j^{th}$ document in the plurality of digital documents N is a number of documents in the plurality of digital documents, and M is a number of documents in the given subset of documents.

As was discussed hereinabove, the present technology makes use of a machine learning algorithm (MLA) for selection of documents for inclusion in a search index. The developers of the present technology have made the acknowledgment that an MLA used for ranking could be adapted for selecting the documents for inclusion in the search index. More precisely, the one or more MLAs of the present technology are trained to rank documents, with the goal of selecting the most "useful" documents for inclusion in the search index, while taking into account the individual sizes of the documents.

Overview of MLAs

There are many different types of MLAs known in the art. Broadly speaking, MLAs are divided into three categories: supervised learning based MLAs, unsupervised learning based MLAs and reinforcement learning based MLAs.

Supervised learning MLA process is based on a target-outcome variable (or dependent variable), which is to be predicted from a given set of predictors (independent variables). Using these set of variables, the MLA (during training) generates a function that maps inputs to desired outputs. The training process continues until the MLA achieves a desired level of accuracy on the validation data. Examples of supervised learning based MLAs include: Regression, Decision Tree, Random forest, Logistic Regression, etc.

Unsupervised learning MLA does not involve a target or outcome variable to predict per se. Such MLAs are used for clustering a population of values into different groups, which is widely used for segmenting customers into different groups for specific intervention. Examples of unsupervised learning MLA include: Apriori algorithm, K-means.

Reinforcement learning MLA is trained to make specific decisions. During training, the MLA is exposed to a training environment where it trains itself continually using trial and error. The MLA learns from past experience and tries to capture the best possible knowledge to make accurate decisions. Example of reinforcement learning MLA is a Markov Decision Process.

Decision tree based MLAs is an example of supervised learning type of MLA. This type of MLAs uses a decision tree (as a predictive model) to go from observations about an item (represented in the branches) to conclusions about the item's target value (represented in the leaves). Tree models where the target variable can take a discrete set of values are called classification trees; in these tree structures, leaves represent class labels and branches represent conjunctions of features that lead to those class labels. Decision trees where the target variable can take continuous values (typically real numbers) are called regression trees.

In order for the decision trees based MLA to work, it needs to be "built" or trained using a training set of objects containing a large plurality of training objects (such as documents, events, or the like). These training objects are "labelled" by human assessors. As an example, a human assessor can rank a given training object as "not interesting", "interesting" or "highly interesting".

Gradient Boosting

Gradient boosting is one approach for building an MLA based on decision trees, whereby a prediction model in the form of an ensemble of trees is generated. The ensemble of trees is built in a stage-wise manner. Each subsequent decision tree in the ensemble of decision trees focuses training on those nodes that were "weak learners" in the previous iteration(s) of the decision trees ensemble (i.e. those that are associated with poor prediction/high error).

Generally speaking, boosting is a method aimed at enhancing prediction quality of the MLA. In this scenario, rather than relying on a prediction of a single trained algorithm (i.e. a single decision tree) the system uses many trained algorithms (i.e. an ensemble of decision trees), and makes a final decision based on multiple prediction outcomes of those algorithms.

Greedy Algorithms

When generating the decision trees (using, for example, the gradient boosting approach), it is known to use greedy algorithms. A greedy algorithm is an algorithmic paradigm that follows the problem solving heuristic of making the locally optimal choice at each stage (for example, at each level of the decision tree) with an outlook of finding a global optimum. In building the decision trees, the use of the greedy algorithm can be summarized as following: for each level of the decision tree, the MLA tries to find the most optimal value (of the feature and/or the split)—this is the local optimal solution. Once the optimal value for the given node is determined, when the MLA moves to generating a lower level of the decision tree, the previously determined values for the upper nodes are "frozen"—i.e. taken "as is" for the given iteration of the decision tree in the ensemble of the decision trees.

As in a case of a single tree, each tree in the ensemble of trees is built in a greedy fashion, which means that when the MLA is selecting a feature and a split for each node of the tree, the MLA makes a selection that is locally optimal, e.g. the best for the particular node, not for the entire tree in general.

Oblivious Decision Trees

Once the best feature and split are selected for a given node, the algorithm then goes to a child node of the given node and executes the greedy selection of feature and split for that child node. In certain implementations, when selecting a feature for a given node, the MLA algorithm can not use features used in nodes on higher levels of tree depth. In other implementations, for each depth level of the MLA analyzes all possible features, regardless of whether they were used on previous levels. Such trees are called "oblivious" trees, because at each level the tree "forgets" that it used a particular feature on a previous level and considers the feature again. In order to select the best feature and split for the node, a gain function is calculated for each possible variant). The option (feature and split value) with the highest gain is selected.

Prediction Quality Value Parameter

When a given tree is built, in order to determine the quality of the prediction of the given tree (or a given level of the given tree, as the given tree is being built), the MLA calculates a metric (i.e. a "score"), which denotes how close the current iteration of the model, which includes the given tree (or the given level of the given tree) and preceding trees, has gotten in its prediction to the correct answers (targets). The score of the model is calculated based on the predictions made and actual target values (correct answers) of the training objects used for training.

When the first tree is built, the MLA selects values of a first feature and a first split for a root node of the first tree and estimates the quality of such model. In order to do so, the MLA "feeds" the training objects to the first tree in a sense "descending" the training objects through the branches of the decision tree, and the so-fed training objects are split into two (or maybe more) different leafs of the first tree at the first node split (i.e. they get "categorized" by the decision tree or, more specifically, the decision tree model attempts to predict the target of the training object being descended through the decision tree model). Once all the training objects are categorized, a prediction quality value parameter is calculated—in a sense determining how close the categorization of objects is to the actual values of the targets.

More specifically, knowing the target values of the training objects, the MLA calculates the prediction quality value parameter (e.g. information gain or the like) for this first feature—first split node and then selects a second feature with a second split for the root node. For this second variant of feature and split for the root node, the MLA executes the same steps as it did with the first variant (the MLA feeds training objects to the tree and calculates the resulting metric using the second variant of a combination of the feature and the split for the root node).

The MLA then repeats the same process with the third, fourth, fifth, etc. features and splits variants for the root node until the MLA covers all possible variants of the feature and the split and then the MLA chooses the feature and split variant for the root node which yields the best prediction outcome (i.e. has the highest metric).

Once the feature and split variant for the root node are selected, the MLA proceeds to the child nodes of the root node and selects features and splits for the child nodes same way as it did for the root node. The process is then repeated for further child nodes of the first tree until the decision tree is built.

Then, according to the boosting approach, the MLA moves to build the second three. The second tree is aimed to enhance the prediction results of the first tree. It should "correct" prediction mistakes of the first tree. For that to occur, the second tree is built on a training object where examples, in which the first tree made prediction made prediction errors, are weighted with higher weights than examples in which the first tree rendered a correct prediction. The second tree is built similarly to how the first tree has been build.

With this approach, tens, hundreds or even thousands of threes are consequently built. Each of the subsequent tree in the ensemble of trees enhancing prediction quality of the previous ones.

Learning to Rank

The use of MLAs for construction of ranking models for information retrieval systems is also known in the art, and is referred to as learning to rank or machine-learned ranking (MLR). Broadly speaking, MLR approaches may be categorized into three categories: pointwise approaches, pairwise approaches, and listwise approaches. Generally, MLR approaches may be characterized by their input space, their output space, their hypothesis space and their loss functions. The input space contains the objects under investigation, and the output space contains the learning target with respect to the input objects. The hypothesis space defines the class of functions mapping the input space to the output space, or, in other words, the functions that operate on the input objects to make predictions based on the format of the output space. The loss function generally measures the degree of accuracy of the prediction, as an example by measuring how ground-truth labels are in accordance with labels generated by the hypothesis. The loss function also allows defining an empirical risk on the set of training objects, where the hypothesis is inferred by means of empirical risk minimization.

The pointwise approach for ranking is characterized by an input space of a single document (or a feature vector thereof), an output space of real values (e.g. relevance degree) or categories (which may be ordered or non-ordered, depending on the techniques used), and a hypothesis space of a scoring function, which predicts the relevance degree of the document. Ranking is thus reduced to a regression, a classification, or an ordinal regression problem. The loss function may be a regression loss, a classification loss, or an ordinal loss, depending on the type of scoring function. The documents may then be sorted and ranked based on the relevance degree. It is noted that the pointwise approach has some limitations, such as not considering the inter-dependency between documents, which makes the position of a document in a ranked list "invisible" to the loss function, and the approach does not make use of the fact that some documents may be associated with the same query. Examples of MLAs using the pointwise approach include: Least Square Retrieval Function, Subset Ranking using Regression, Discriminative model for IR, McRank, Pranking, and Ranking with Large Margin Principles, among others.

The pairwise approach for ranking is characterized by an input space of a pair of documents, represented as feature vectors, and an output space of a pairwise preference between each pair of documents, taking values from {+1, −1}. The hypothesis space contains a bi-variate function which takes the pair of documents and outputs the relative order between them, or sometimes a scoring function. The loss function measures the inconsistency between the ground-truth label and the bi-variate function. It is noted that in some instances the pairwise approach has some limitations, since some loss functions only look at a pair of documents, the final position of the documents in a ranked list may be hardly derived, and the approach ignores that some pairs are generated from documents associated with the same query. Examples of MLAs using the pairwise approach include: Learning to Order Things, Ranking SVM, RankBoost, RankNet, and Frank, among others.

The listwise approach for ranking is characterized by an input space of a set of documents associated with a query, and an output space of a ranked list (or permutations of the document). Different judgments may be converted to ground truth labels: a relevance degree judgment, where all permutations consistent with the judgment are ground truth permutations, and a pairwise preference judgment, where all permutations consistent with the judgment are also ground truth permutations. The hypothesis space contains multi-variate functions that operate on a set of documents and predict their permutation, which may be a scoring function used to give a score to each document, and documents may be sorted to produce the desired permutations. There are two types of loss functions, widely used in the listwise approach: a loss function explicitly related to the evaluation measures (measure-specific loss function), and a loss function not related to the evaluation measures (non-measure-specific loss function). It is noted that building blocks of the listwise loss function may be similar to some pointwise or pairwise approaches. Examples of listwise approaches include: Soft-Rank, ListMLE, ListNet, AdaRank, and RankCosine, among others.

Before arriving at the solution proposed herein, developers used different approaches that inspired the present technology, which shall be reviewed briefly herein below.

Selection of Documents Based on Historical Value

A first approach considered by the developers for solving the aforementioned problem is based on the use of historical data of documents, as tracked by the search engine system. For any past period of time (e.g. day, week, month, year, etc.), a search engine history log can be analyzed for determining which documents were shown to users, and a number of times each document was shown during that period of time. All documents that were ever shown to the users of the search engine in the past could be selected for inclusion in the search index, as a non-limiting example based on different thresholds. As the number of documents which were ever shown to the users as search results is lesser than the total number of existing (crawled) documents, a total size of the documents selected for inclusion into the search index by considering the number of shows is lesser than the total size of crawled documents. It is thus possible to include in the index documents with a "demonstrated" historical value (past shows, clicks, and the like) based on the historical data tracked by the search engine system. If the selected documents do not fit into the index size limit, only documents having a demonstrated historical value (shows, clicks, and other user interactions) above some empirically determined threshold could be selected.

However, developers realized that this approach had a major drawback—it cannot be generalized, as when a new document appears on the Web, it does not have any history of shows or clicks, i.e. any demonstrated historical value. Thus, if documents are selected for inclusion into the index based solely on their demonstrated historical value, new documents could not be added to the search index and at some point a quality of the search index would drop dramatically, and users of the search engine would be less satisfied. In some implementations, this approach may be combined with other approaches such that some part of the index is built using the demonstrated historical value of the documents, and remaining parts could be built using other techniques for selecting documents for inclusion into the search index (e.g. predicted document value).

Selection of Documents Based on Predicted Value

A second approach considered by the developers of the present technology for solving the aforementioned problem was based on the use of a trained MLA to predict values of crawled documents. An MLA could be trained on examples of documents that have been previously provided as search results to users of the search engine, and based on the features of the documents and the historical data associated with the documents, the MLA could infer a "score" of the document based solely on the features of the documents. For any given digital document, the features may include, but are not limited to: how frequently other documents from the same domain were shown to the users over a period of time, content-based features, a number of links referring to the given digital document, a number of links to other documents contained within the given digital document, a historical number of visits to the given digital document from other sources than the search engine (e.g. by typing the URL of the document in the address bar of the browser, or visits via the links contained in other documents) and the like. There are numerous features which may have a correlation with the score.

Thus, the MLA may predict a score or "usefulness" value of documents having a demonstrated historical value, and could predict a usefulness value of new documents that may not have any historical value, based on the features of the document.

One drawback of this approach is the difficulty of finding clear targets for use in training, i.e. what parameter should be considered by the MLA as a proxy for the usefulness value. Further, if parameters such as clicks or shows or other parameters reflecting historical popularity of a given digital document are used, a size of the given digital document is not taken into account by the MLA, which is sub-optimal, since there is a limitation on the size of the search index.

Selection of Documents Based on Predicted Value Parameter and Size

Another approach considered by the developers of the present technology for solving the aforementioned problem is using a MLA for predicting a score or "quality" value of the document, based on a predicted value parameter or usefulness value of the document, while also taking into account the size of the document.

The developers proposed that a quality value of a document, which takes into account the value parameter and the size of the document could be expressed as:

$$q(d_i) = \frac{p(d_i)}{f(\text{size}(d_i))} \quad (1)$$

where $d_i$ is a $i^{th}$ document in a set of documents, $p(d_i)$ is a value parameter of the $i^{th}$ document, $size(d_i)$ is a size of the $i^{th}$ document in bytes, $f(size(d_i))$ is a function taking into account the size of the $i^{th}$ document, and $q(d_i)$ is the quality value of the $i^{th}$ document.

Using logarithmic functions, equation (1) becomes:

$$q(d_i) = \log(p(d_i)) - k \cdot \log(\text{size}(d_i)) \quad (2)$$

which may be simplified to:

$$q_i = g\left(\frac{p_i}{s_i^k}\right) \quad (3)$$

where $p_i$ is the value parameter of the $i^{th}$ document, $s_i$ is the size of the $i^{th}$ document in bytes, k is a constant, g is a manually selected logarithmic function, and $q_i$ is a quality value of the $i^{th}$ document.

In this approach, the only parameter predicted by the MLA is $p_i$, the value parameter (usefulness value) of the $i^{th}$ document, and $q_i$ may be a manually selected function with one or more coefficients, where some coefficients may be empirically determined.

After a series of experiments, the developers realized that $$q_i = g\left(\frac{p_i}{s_i^k}\right)$$

may not be an optimal function for ranking documents for inclusion in the search index, as the function may not take in account some hidden dependencies and correlations, which is equivalent to using a manually selected function for ranking search results in response to user queries.

Selection of Documents Based on a Pointwise Ranking Approach

The developers subsequently considered using a MLA implementing a pointwise ranking function. In order to train the MLA, an ideal ranking of documents must be provided. One approach is to compute, for each document, a parameter based on $p_i/s_i$, and to train the MLA based on historical or predicted values and a size of the document to predict this parameter. This approach has the advantage of using a machine learned ranking function rather than a manually selected ranking function.

However, as stated above, an ideal ranking of documents must be provided, which may be difficult to determine, as choosing between a little number of documents with high value parameters and a higher number of documents with little to average value is challenging. Further, as stated above, the pointwise ranking approach has the limitations of not considering the inter-dependency between documents, which is important for the aforementioned problem, because the relative ranking between documents is necessary to obtain an optimal overall ranking.

Selection of Documents Based on a Pairwise Ranking Approach

The developers also considered using a MLA implementing a pairwise ranking function. The MLA could be trained on pairs of pre-ordered documents (where the documents in each pair are ranked relative to each other), and where the label indicates the right order. The problem could thus be approximated as a classification problem, where the MLA learns a binary classifier that outputs an optimal ranking of documents in a pair, and where the goal is to minimize an average number of inversions in the ranking.

This approach in a way considers documents in relation to each other, since it views documents in pairs. However, in order to generate a training set, the operators of the MLA need to devise an ideal ranking (i.e. ideal ranking of documents in the pairs), and need to generate the pairs and use some of the parameters to rank the documents within those pairs. In other words, the operators have to solve the optimization problem manually. Such a ranking within the training pairs could be done using the $p_i/s_i$ parameter as a proxy for rank. However this approach did not allow solving the overall optimization problem with sufficient quality.

Selection of Documents Based on a Listwise Ranking Approach

Subsequently, developers considered an MLA implementing a listwise ranking algorithm (or a pairwise algorithm modified such that it behaves like a listwise algorithm), where the MLA could directly optimize a value of an evaluation measure, which would be averaged over all training examples.

The developers introduced a function to optimize, which takes into consideration the individual quality values of a set of documents, the individual value parameters (usefulness value) of documents in the set of documents, the individual sizes of documents in the set of documents, a total quality value of the set of documents, and the total size of the set of documents. This function may be expressed in two equations:

$$Q = \sum_{p_i > T} q_i \rightarrow \max \qquad (4)$$

$$T = \max_t \left\{ \left( \sum_{p_i < t} s_i \right) < B \right\} \qquad (5)$$

where $q_i$ is a quality value parameter of the $i^{th}$ document (being a sum of all documents having a rank higher than T), $p_i$ is the value parameter of the $i^{th}$ document (as predicted by a fixed ranking algorithm), T is a threshold from which top ranked documents are placed into the search index (where a sum of the sizes of top ranked documents is less than a size of the search index B), $s_i$ is a size of the $i^{th}$ document, Q is a total quality value of the documents, B is the size of the search index, and t is a "free" value parameter over which to maximize (i.e. T is a maximal value of t such that documents fit in the search index).

In other words, these two equations are a mathematical representation of the problem to be solved in the context of the present technology, which may be expressed as finding a quality value threshold, such that the total size of the set of documents selected for inclusion in the search index is below the size limit of the search index, while the total quality value (i.e. sum of all individual quality values) of those documents is maximized.

The objective is thus for an MLA implementing a listwise-like algorithm to learn a ranking function such that equations (4) and (5) would be optimized. Since equations (4) and (5) are arduous to optimize, the developers substituted the equations with another equation (an "approximation equation"), which may be used as a utility function that needs to be optimized during the training of the MLA, which may also be interpreted as an evaluation metric:

$$Q_m = \sum_i^N \left( q_i \cdot \sum_j^M s_j \right), \, p_j < p_i \qquad (6)$$

where: $Q_m$ is a cumulative quality value parameter, $q_i$ is the quality value parameter of the ith document in a plurality of digital documents, $s_j$ is a respective size of a jth document in the plurality of digital documents, $p_i$ is a value parameter of the ith document in the plurality of digital documents, N is a number of documents in the plurality of digital documents, and M is a number of documents in a given subset of documents having a value parameter below the value parameter of the ith document in a plurality of digital documents.

Thus, the MLA of the present technology may be provided with training examples of documents, and directly optimize equation (6) to learn a ranking function. The ranking function could then be used to rank documents for inclusion in the search index, such that the cumulative quality value parameter $Q_m$ is maximized.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, the expression "plurality of search results" is intended to include a set of more than one search result, where general (e.g., Web) search results and/or vertical search results are integrated together within the set of search results or on a search results page. For example, vertical search results may be integrated into general (e.g., Web) search results within a search results page, or vice-versa, i.e., general search results may be integrated into vertical search results within a search results page. Thus, in some embodiments, general search results and vertical search results may be aggregated and ranked relative to each other. In alternative embodiments, a plurality of search results may include only general search results or only vertical search results, e.g., search results from a particular vertical domain of interest.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
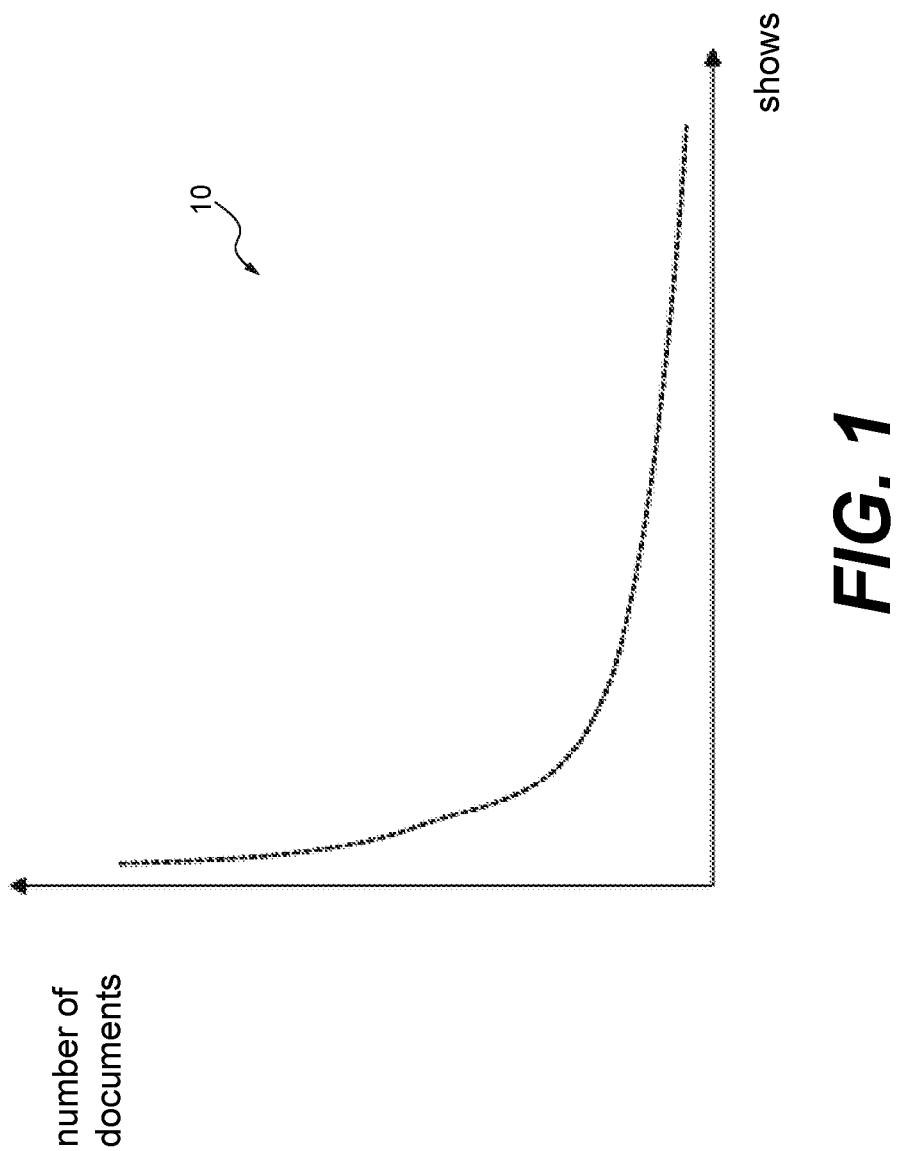
FIG. 1 depicts a schematic representation of a distribution of a number of documents available in a search index respect to a number of time the documents were shown in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Figure 2:
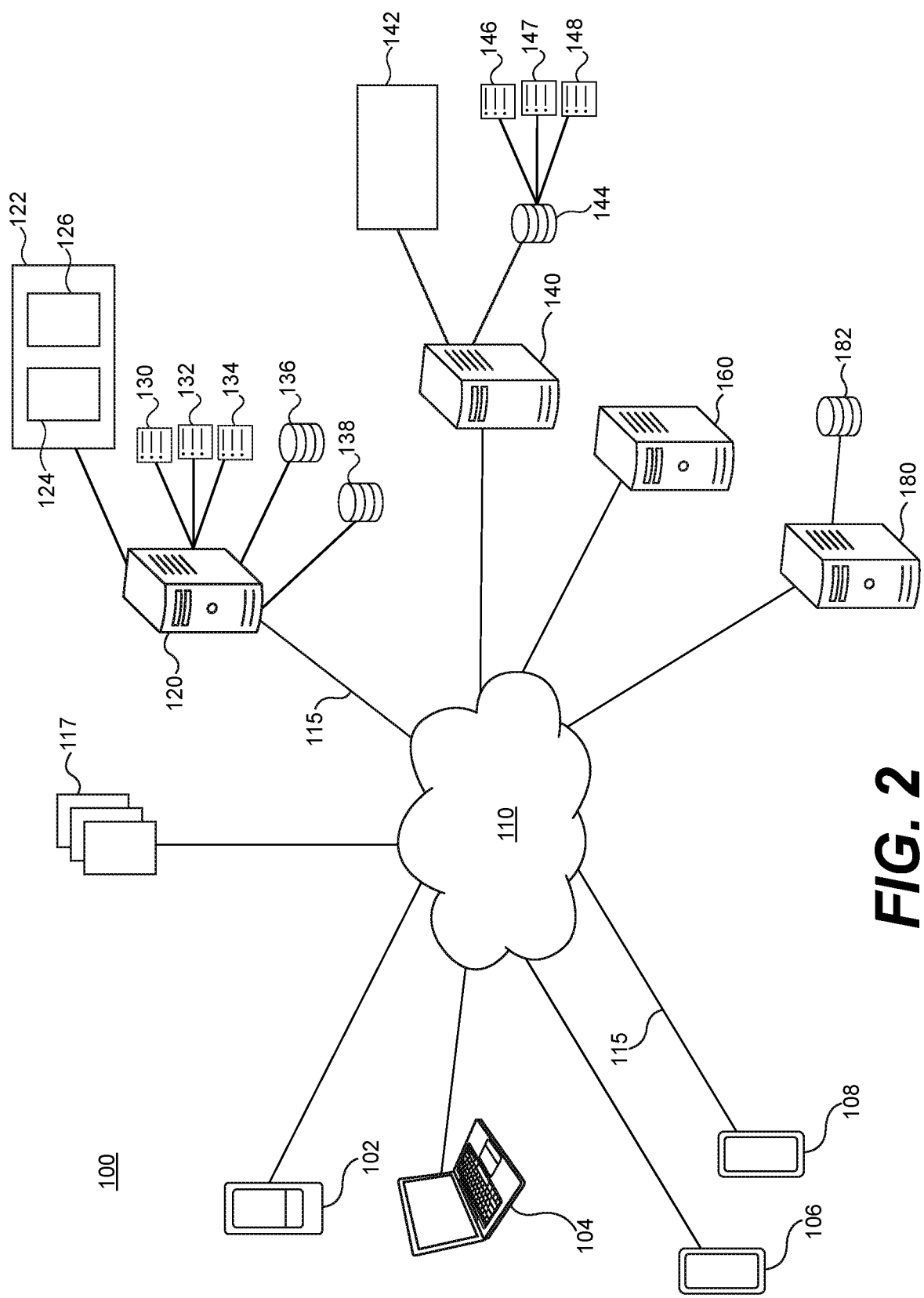
FIG. 2 depicts a diagram of a system implemented in accordance with non-limiting embodiments of the present technology.

With reference to FIG. 2, there is depicted a system 100, the system 100 implemented according to non-limiting embodiments of the present technology. The system 100 comprises a first client device 102, a second client device 104, a third client device 106, and a fourth client device 108 coupled to a communications network 110 via a respective communication link 115 (only one numbered in FIG. 2). The system 100 comprises an indexing server 120, a search engine server 140, an analytics server 160, and a training server 180 coupled to the communications network 110 via their respective communication link 115. In some embodiments of the present technology, the indexing server 120, the search engine server 140, the analytics server 160, and the training server 180 may be implemented as a single server.

As an example only, the first client device 102 may be implemented as a smartphone, the second client device 104 may be implemented as a laptop, the third client device 106 may be implemented as a smartphone and the fourth client device 108 may be implemented as a tablet. In some non-limiting embodiments of the present technology, the communications network 110 can be implemented as the Internet. In other embodiments of the present technology, the communications network 110 can be implemented differently, such as any wide-area communications network, local-area communications network, a private communications network and the like.

How the given communication link 115 is implemented is not particularly limited and will depend on how the associated one of the first client device 102, the second client device 104, the third client device 106 and the fourth client device 108 are implemented. Merely as an example and not as a limitation, in those embodiments of the present technology where at least one of the first client device 102, the second client device 104, the third client device 106 and the fourth client device 108 is implemented as a wireless communication device (such as a smart-phone), the associated one of the communication link 115 can be implemented as a wireless communication link (such as but not limited to, a 3G communications network link, a 4G communications network link, a Wireless Fidelity, or WiFi® for short, Bluetooth® and the like). In those examples, where at least one of the first client device 102, the second client device 104, the third client device 106 and the fourth client device 108 are implemented respectively as laptop, smartphone, tablet computer, the associated communication link 115 can be either wireless (such as the Wireless Fidelity, or WiFi® for short, Bluetooth® or the like) or wired (such as an Ethernet based connection).

It should be expressly understood that implementations for the first client device 102, the second client device 104, the third client device 106, the fourth client device 108, the communication link 115 and the communications network 110 are provided for illustration purposes only. As such, those skilled in the art will easily appreciate other specific implementational details for the first client device 102, the second client device 104, the third client device 106, the fourth client device 108 and the communication link 115 and the communications network 110. As such, by no means, examples provided herein above are meant to limit the scope of the present technology.

While only four client devices 102, 104, 106 and 108 are illustrated (all are shown in FIG. 2), it is contemplated that any number of client devices 102, 104, 106 and 108 could be connected to the system 100. It is further contemplated that in some implementations, the number of client devices 102, 104, 106 and 108 included in the system 100 could number in the tens or hundreds of thousands.

Indexing Server

Also coupled to the communications network 110 is the above-mentioned indexing server 120. The indexing server 120 can be implemented as a conventional computer server. In an example of an embodiment of the present technology, the indexing server 120 can be implemented as a Dell™ PowerEdge™ Server running the Microsoft™ Windows Server™ operating system. Needless to say, the indexing server 120 can be implemented in any other suitable hardware and/or software and/or firmware or a combination thereof. In the depicted non-limiting embodiment of present technology, the indexing server 120 is a single server. In alternative non-limiting embodiments of the present technology, the functionality of the indexing server 120 may be distributed and may be implemented via multiple servers. In other embodiments, the functionality of the indexing server 120 may be implemented completely or partially by the search engine server 140. In some embodiments of the present technology, indexing server 120 is under control and/or management of a search engine operator. Alternatively, the indexing server 120 can be under control and/or management of another service provider.

Generally speaking, the purpose of the indexing server 120 is to (i) crawl the Web and retrieve documents, such as a plurality of digital documents 117; (ii) process the plurality of digital documents 117; and (iii) index at least a portion of the processed plurality of digital documents 117 in a search index 146 of a search engine server 140 (both of which will be described in greater detail herein below. The indexing server 120 executes a plurality of crawlers 122, a parser 130, a first MLA 132, and is connected to a crawling database 136 and a preindexing database 138.

The plurality of digital documents 117 may be hosted by various computer systems accessible over the Web, for example. The nature of the plurality of digital documents 117 is not particularly limited. In the context of the present specification, the plurality of digital documents 117 may also be referred to as "a plurality of web pages", "web pages", "web documents" or simply "documents". However, it is contemplated that a given one of the plurality of digital documents 117 may be any form of structured digital information that can be retrieved or accessed via a corresponding Universal Resource Locator (URL), without departing from the scope of the present technology.

Broadly speaking, a given one of the plurality of digital documents 117 may contain one or more sentences. A given one of the plurality of digital documents 117, can be, for example, a web page containing text and/or images (such as, for example, a news article recently published and relating to some breaking news). Another given one of the plurality of digital documents 117, can be, as another example, a digital version of a book (such as, for example, a digital version of *"Pride and Prejudice"* by Jane Austin). Another given one of the plurality of digital documents 117, can be, as another example, an article on Wikipedia™, which can be updated from time to time.

It is contemplated that at least some of the plurality of digital documents 117 may have been recently created (or updated) or otherwise may have been recently made accessible over the Web. Indeed, a very large number of web pages are created or otherwise made accessible over the Web everyday and, as such, there may be a need to index at least some of these web pages so as to provide their content to users of a given search engine.

It should be noted that at least some of the plurality of digital documents 117 may be "fresh" web pages, such as web pages having fresh content that is likely to be updated relatively frequently (e.g., weather), while at least some others of the plurality of digital documents 117 may be "stagnant" web pages, such as web pages having stagnant content that is less likely to change or be changed with less frequent intervals (e.g., Wikipedia article on the Canadian constitution). On the one hand, usefulness of fresh content to users of a given search engine usually (i) peaks close to the moment of its creation and (ii) drops after some period of time. On the other hand, usefulness of stagnant content to users of the given search engine usually (i) is lower near the moment of its creation than usefulness of fresh content near the moment of its creation but (ii) is somewhat constant throughout time.

It is contemplated that at least some of the plurality of the digital documents 117 may have been previously indexed, while at least some others of the plurality of digital documents 117 may not have been previously indexed. For example, the plurality of digital documents 117 may comprise "new" web pages which have not been previously indexed. In another example, the plurality of digital documents 117 may comprise "old" web pages which have been previously indexed. In yet another example, the plurality of digital documents 117 may comprise "updated" web pages which are, in a sense, "updated" versions of old web pages, where the content of the updated version of the web page is different from the content of the old version of the web page which has been previously indexed.

The plurality of crawlers 122 includes main crawlers 124 and express crawlers 126. The main crawlers 124 are configured to crawl the plurality of digital documents 117 on the Web starting from a list of URLs to visit (not depicted), where hyperlinks in the documents are also identified and added to the list to visit. The express crawlers 126 are configured to perform express indexing of "fresh" documents (which may be included the plurality of digital documents 117) that appeared on the Web just before the crawling procedure, such that the fresh documents are also available for indexing. The main crawlers 124 and the express crawlers 126 also include respective schedulers (not depicted) which create schedules and orders of documents to crawl on the Web. The plurality of crawlers 122, including the main crawlers 124 and the express crawlers 126 generally download the plurality of digital documents 117, and store the plurality of digital documents 117 in the crawling database 136.

The parser 130 is generally configured to parse the plurality of digital documents 117 stored in the crawling database 136 and extract information therefrom, such as index terms and hyperlinks. The parser 130 generally clears markup language from the crawled documents, such that text information can be extracted and later analyzed or used directly for indexing. The parser 130 may further extract a plurality of features from the documents, such as features used for ranking (ranking features), URL features, click features, document features, and the like. In some embodiments, the parser 130 may save the extracted information as feature vectors in the preindexing database 138. In other embodiments, the indexing server 120 may execute a feature extractor (not depicted) for extracting the features of the plurality of digital documents 117 from the crawling database 136.

The first MLA 132 is configured to select at least a portion of the plurality of digital documents 117 for inclusion in the search index 146 of the search engine server 140 based on feature vectors of the plurality of digital documents 117, as well as other information associated with plurality of digital documents 117, the feature vectors being stored in the preindexing database 138. How the first MLA 132 selects the documents for inclusion in the search index 146 will be explained in more detail herein below.

Search Engine Server

Also coupled to the communications network 110 is the aforementioned search engine server 140. The search engine server 140 can be implemented as a conventional computer server. In an example of an embodiment of the present technology, the search engine server 140 can be implemented as a Dell™ PowerEdge™ Server running the Microsoft™ Windows Server™ operating system. Needless to say, the search engine server 140 can be implemented in any other suitable hardware and/or software and/or firmware or a combination thereof. In the depicted non-limiting embodiment of present technology, the search engine server 140 is a single server. In alternative non-limiting embodiments of the present technology, the functionality of the search engine server 140 may be distributed and may be implemented via multiple servers. In some embodiments of the present technology, the search engine server 140 is under control and/or management of a search engine operator. Alternatively, the search engine server 140 can be under control and/or management of a service provider.

Generally speaking, the purpose of the search engine server 140 is to (i) execute searches; (ii) execute analysis of search results and perform ranking of search results in response to a search request; (iv) group results and compile the search engine result page (SERP) to be outputted to an electronic device (such as one of the first client device 102, the second client device 104, the third client device 106 and the fourth client device 108), the electronic device having been used to submit the search request that resulted in the SERP.

How the search engine server 140 is configured to execute searches is not particularly limited. Those skilled in the art will appreciate several ways and means to execute the search using the search engine server 140 and as such, several structural components of the search engine server 140 will only be described at a high level. The search engine server 140 may maintain a search log database 144.

The search engine server 140 is configured to perform general domain searches, as is known to those skilled in the art. For example, a general domain search is not confined to search a specific category of results but is able to provide all results that best match the search query. Such a general (category-independent) search by the search engine server 140 may return search results that include non-category specific digital content as well as category specific digital content, such as images, videos, news, shopping, blogs, books, places, discussions, recipes, tickets, biographical information, patents, stocks, timelines, etc., and other digital content that is closely related and directed toward a certain type of digital content. As an example, a general domain search may be a WWW search. A search performed in a general domain generates a "general search result" or "general search result item." Such general search results are also referred to herein as "web results." Typically, a web result includes a website link and a snippet that summarizes content of the website. A user may select a website link of a web result to navigate to the webpage related to the user search query. The terms "general search result" and "general search result item" are used interchangeably herein, as are the terms "search result" and "search result item."

The search engine server 140 is also configured to perform vertical domain searches. For example, a vertical domain may be an information domain containing specialized content, such as content of a single type (e.g., media type, genre of content, topicality, etc.). A vertical domain thus includes a specific subset of a larger set of data, for example, a specific subset of web data. For example, a vertical domain may include specific information such as images, videos, news, shopping, blogs, books, places, discussions, recipes, tickets, biographical information, patents, stocks, timelines, etc. A search performed in a vertical domain generates a "vertical search result" or a "vertical search result item". Such vertical search results are also referred to herein as "verticals" and "vertical results." The terms "vertical search result" and "vertical search result item" are used interchangeably herein.

The search engine server 140 is configured to generate a ranked search results list, including the results from the general domain search and the vertical domain search. The search engine server may execute one or more MLAs 142 for ranking documents to generate the ranked search results list.

Multiple algorithms for ranking the search results are known and can be implemented by the search engine server 140.

Just as an example and not as a limitation, the one or more MLAs 142 may rank the documents by relevancy to the user-submitted search query based on some or all of: (i) how popular a given search query is in searches; (ii) how many results have been returned; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP. The search engine server 140 can thus calculate and assign a relevance score (based on, but not limited to, the different criteria listed above) to each search result obtained in response to a user-submitted search query and generate a SERP, where search results are ranked according to their respective relevance scores.

Search Log Database

The search engine server 140 typically maintains the above-mentioned search log database 144.

Generally, the search log database 144 may include a search index 146, a search query log 147, and a user interaction log 148.

The purpose of the search index 146 is to index documents (or indication of documents), such as, but not limited to, web pages, images, videos, Portable Document Format (PDF) documents, Microsoft Word™ documents, Microsoft PowerPoint™ documents, that have been selected by the first MLA 132. In some embodiments of the present technology, the search index 146 is maintained in a form of posting lists. As such, when a user of one of the first client device 102, the second client device 104, the third client device 106, and the fourth client device 108 inputs a search query and performs a search on the search engine server 140, the search engine server 140 analyzes the search index 146 and retrieves documents that contain terms of the query, and ranks them according to a ranking algorithm.

The purpose of the search query log 147 is to maintain a log of searches submitted on the search engine server 140. More specifically, the search query log 147 may maintain a list of queries, each respective query of the list having respective search terms, the associated documents that were listed by the search engine server 140 in response to the respective search query, a number of submissions over time of the respective query (referred to as a frequency of past use herein below), and may also contain a list of users (or group of users) identified by anonymous IDs (or without an ID altogether) and the respective documents they have clicked on after submitting the respective search query. In some embodiments, the search query log 147 may be updated every time a new search is performed on the search engine server 140. In other embodiments, the search query log 147 may be updated at predetermined times. In some embodiments, there may be a plurality of copies of the search query log 147, each corresponding to the search query log 147 at different points in time.

The manner in which the user interaction log 148 is structured is not limited. The user interaction log 148 may be linked to the search query log 147, and list user-interaction parameters as tracked by the analytics server 160 after a user has submitted a search query and clicked on one or more documents in a SERP on the search engine server 140. As a non-limiting example, the user interaction log 148 may maintain: (i) a reference to a respective document or an indication thereof, which may be identified, as a non-limiting example, by an ID number or an URL; (ii) a respective list of queries, where each respective query of the list of respective queries is associated with the respective document, and where each of the respective queries has been used by one or more users to access the respective document; and (iii) a respective plurality of user-interaction parameters per query (if the document was interacted with), which are indicative of user-interactions with the respective document by users having submitted the respective query of the list of queries. The user interaction log 148 may further include respective timestamps associated with the respective user-interactions, and other statistical data. In some embodiments, the search query log 147 and the user interaction log 148 may be implemented as a single log.

Generally speaking, data from the search log database 144 (including data from the user interaction log 148) may be acquired by at least one of the search engine server 140, and the analytics server 160, in a synchronous manner (i.e. at predetermined time intervals), or in an asynchronous manner (e.g. upon receipt of an indication).

In the present embodiment, the user interactions in the user interaction log 148 may generally be tracked and compiled by the analytics server 160.

Analytics Server

Also coupled to the communications network 110 is the above-mentioned analytics server 160. The analytics server 160 can be implemented as a conventional computer server. In an example of an embodiment of the present technology, the analytics server 160 can be implemented as a Dell™ PowerEdge™ Server running the Microsoft™ Windows Server™ operating system. Needless to say, the analytics server 160 can be implemented in any other suitable hardware and/or software and/or firmware or a combination thereof. In the depicted non-limiting embodiment of present technology, the analytics server 160 is a single server. In alternative non-limiting embodiments of the present technology, the functionality of the analytics server 160 may be distributed and may be implemented via multiple servers. In other embodiments, the functionality of the analytics server 160 may be implemented completely or partially by the search engine server 140. In some embodiments of the present technology, the analytics server 160 is under control and/or management of a search engine operator. Alternatively, the analytics server 160 can be under control and/or management of another service provider.

Generally speaking, the purpose of the analytics server 160 is to track user interactions with the search engine server 140 of the search engine server 140, such as search queries and terms entered by users, and documents subsequently accessed by the users (such as users of the first client device 102, the second client device 104, the third client device 106, and the fourth client device 108). The analytics server 160 may track user interactions (such as, for example, click-through data) when users perform general domain searches and vertical domain searches on the search engine server 140.

Non-limiting examples of user interactions tracked or computed by the analytics server 160 include:
Loss/Win: was the document clicked in response to the search query or not.
Dwell time: time a user spends on a document before returning to the SERP.
Long/short click: was the user interaction with the document long or short, compared to the user-interaction with other documents on the SERP.
Click-through rate (CTR): Number of clicks on an element divided by the number of times the element is shown (impressions).

Naturally, the above list is non-exhaustive and may include other types of user-interaction parameters without departing from the scope of the present technology.

The analytics server 160 may transmit the tracked user interaction data to the search engine server 140 such that it can be stored in the search query log 147 and the user interaction log 148 of the search log database 144. In some embodiments, the analytics server 160 may store the user interactions and associated search results locally in a user interaction log (not depicted). In alternative non-limiting embodiments of the present technology, the functionality of the analytics server 160 and the search engine server 140 can be implemented by a single server.

Training Server

Also coupled to the communications network 110 is the above-mentioned training server 180. The training server 180 can be implemented as a conventional computer server. In an example of an embodiment of the present technology, the training server 180 can be implemented as a Dell™ PowerEdge™ Server running the Microsoft™ Windows Server™ operating system. Needless to say, the training server 180 can be implemented in any other suitable hardware and/or software and/or firmware or a combination thereof. In the depicted non-limiting embodiment of present technology, the training server 180 is a single server. In alternative non-limiting embodiments of the present technology, the functionality of the training server 180 may be distributed and may be implemented via multiple servers. In other embodiments, the functionality of the training server 180 may be implemented completely or partially by the search engine server 140. In some embodiments of the present technology, the training server 180 is under control and/or management of a search engine operator. Alternatively, the training server 180 can be under control and/or management of another service provider.

Generally speaking, the purpose of the training server 180 is to train MLAs executed by the indexing server 120, and the search engine server 140. The training server 180 is configured to train the one or more MLAs 142 of the search engine server 140. The training server 180 is configured to train the first MLA 132 and a second MLA 134 for selecting documents from the preindexing database 138 for inclusion in the search index 146.

The training server 180 is connected to a training database 182. Generally speaking, the training database 182 may store information, such as training objects, used for training the one or more MLAs 142 of the search engine server 140, the first MLA 132, and the second MLA 134 of the indexing server 120.

Figure 3:
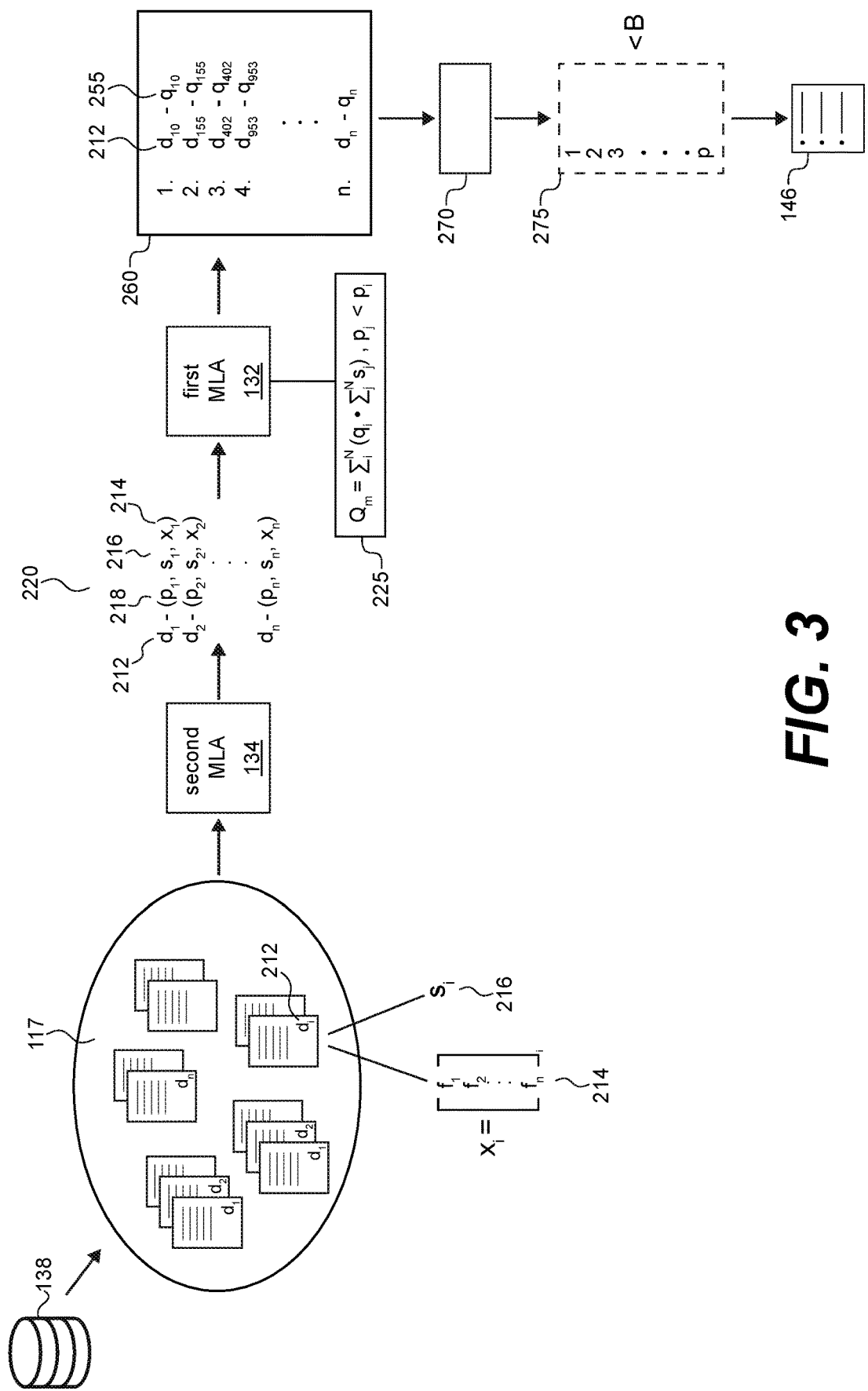
FIG. 3 depicts a schematic representation of an in-use phase of a first MLA 132 and a second MLA processed by the system of FIG. 2 in accordance with non-limiting embodiments of the present technology.

Now turning to FIG. 3, there is depicted a schematic diagram of an in-use phase 200 of the first MLA 132 and the second MLA 134 in accordance with non-limiting embodiments of the present technology.

The first MLA 132 may be executed by the indexing server 120.

Generally speaking, the first MLA 132 is configured to generate a ranking of the plurality of digital documents 117 available in the preindexing database 138 to obtain a ranked list of documents 260, where a subset 275 of the ranked list of documents 260 may be selected for inclusion in the search index 146. The ranked list of documents 260 is generated by the first MLA 132 such that a utility function 225 is maximized.

The second MLA 134 may acquire the plurality of digital documents 210 (or an indication thereof) from the preindexing database 138, each given digital document 212 being associated with a respective feature vector 214 and a respective size 216.

The second MLA 134 may generate a value parameter 218 of each given digital document 212 (or an indication thereof) based on the feature vector 214 of the given digital document 212. Generally speaking, the value parameter 218 may be indicative of general relevance or a usefulness of the given digital document 212 to the search engine server 140, and may at least partially predict future user interactions with the given digital document 212 based on the associated feature vector 214, in instances where the given digital document 212 is a fresh document that does not have any associated past user interactions in the user interaction log 148.

In instances where the given digital document 212 is associated with past user interactions in the user interaction log 148, the value parameter 218 may be based at least partially on those past user interactions, and may be interpreted as a general "relevance" of the given digital document 212 to the search engine server 140, and may take into account a number of queries the given digital document 212 was provided in response to, as well as its associated ranking, associated user interactions, and other factors, which may be included in the associated feature vector 214.

In other embodiments, the value parameter 218 may be query-independent, i.e. not take into account the relevance of the given digital document 212 to a number of queries on the search engine server 140, while taking into account past user interactions with the given digital document 212. In some embodiments, the "predicted" value parameter 218 and the value parameter based on past user interactions may be computed by separate MLAs (not depicted).

Alternatively, the value parameter 218 for a given digital document 212 having past user interaction data may be a user interaction (such as one or more of clicks, CTR, dwell time, and the like) or a combination of user interactions, and the value parameter 218 for a given digital document 212 not having past user interaction data may be a prediction of the one or more user interactions.

The second MLA 134 may then output a set of parameters 220, the set of parameters 220 including, for each given digital document 212 of the plurality of digital documents 117: an indication of the given digital document 212, the associated value parameter 218, the associated feature vector 214, and the associated size 216 of the given digital document 212.

The first MLA 132 may receive the set of parameters 220 associated with the indication of the plurality of digital documents 117.

The first MLA 132 may compute a quality value parameter 255 for each given digital document 212 of the plurality of digital documents 210, the quality value parameter 255 being indicative of a usefulness of the given digital document 212 to the search engine server 140, by taking into account the associated size 216, and other features of the given digital document 212. The quality value parameter 255 computed by the first MLA 132 may be based on the associated value parameter 218, the associated feature vector 214, and the associated size 216. In some embodiments, the quality value parameter 255 may be based on the associated value parameter 218, and the associated size 216. In alternative embodiments, the quality value parameter 255 may be based at least partially on a ratio of the associated value parameter 218 to the associated size 216.

The first MLA 132 may then rank the plurality of digital documents 317 according to the quality value parameters 255, to output the ranked list of documents 260, such that the utility function 225 is maximized (where the first MLA 132 has been trained based on the utility function 225). The ranked list of documents 260 may thus be an "optimized" ranked list of crawled documents, which takes into account the value parameter 218 and the size 216 of each given digital document 212.

In some embodiments, the first MLA 132 and the second MLA 134 may be a implemented as a single MLA (not depicted), and the single MLA may compute both the value parameter 218 and the quality value parameter 255.

The ranked list of documents 260 may then be received as an input in the selector 270, which may select a subset 275 of the ranked list of documents 260 for inclusion in the search index 146, as an example based on a total size or available size 280 of the search index 146. The selector 270 may generally select a number top ranked document of the ranked list of documents 260 to add to the subset 275 such that a sum of the sizes of top ranked documents is below the total size 280 of the search index 146. The selector 270 may then store the subset 275 in the search index 146.

In some embodiments, the search index 146 may be divided into a plurality of portions (not depicted), where only a given portion of the plurality of portions may be populated at a time, and the selector 270 may only include top ranked documents from the ranked list of documents 260 such that the size of the subset 275 is below a size of the given portion of the search index 146. The first MLA 132 may then re-perform ranking of documents (without documents included in the subset 275) to populate the remaining portions of the plurality of portions of the search index 146 iteratively.

Further, in alternative embodiments, the first MLA 132 may be used to update a current version of the search index 146 used by the server, which may as a non-limiting example be updated portion by portion, where documents of the ranked list of documents 275 already present in the search index 146 may be ignored by the selector 270. Alternatively, the documents already present in the search index 146 may be ignored before the associated value parameter 218 is computed.

Figure 4:
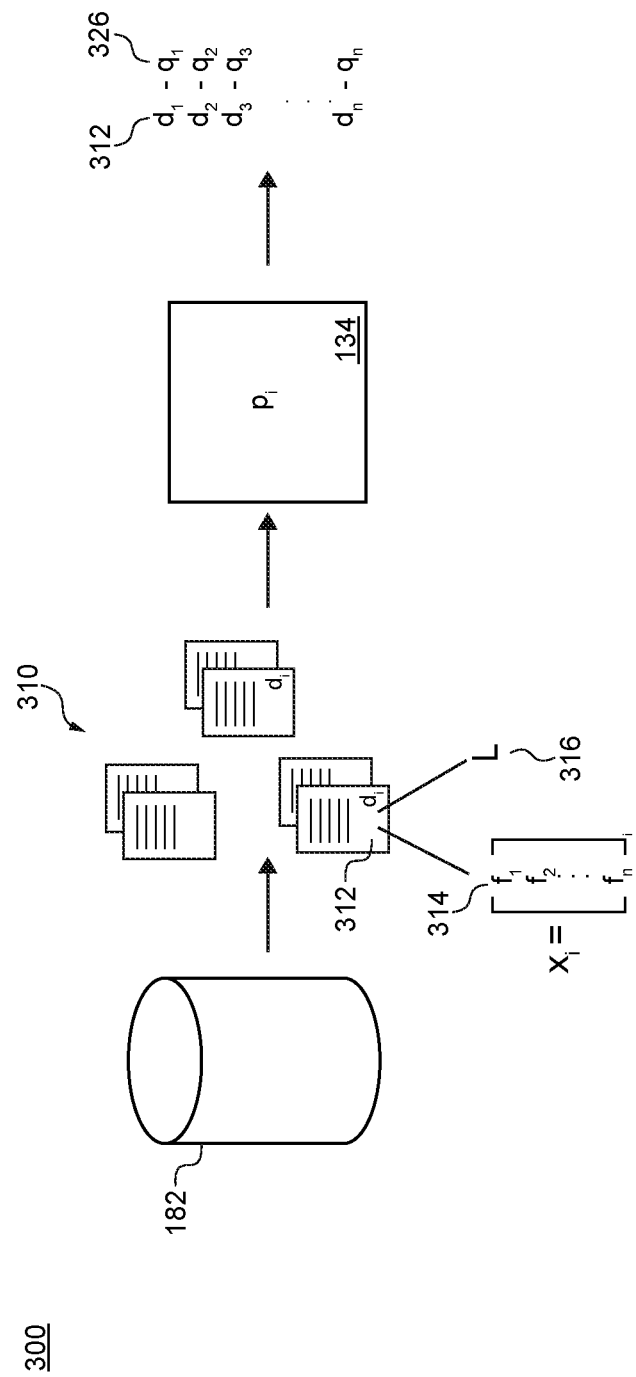
FIG. 4 depicts a schematic representation of a training phase of a second MLA processed by the system of FIG. 2 in accordance with non-limiting embodiments of the present technology.

Now turning to FIG. 4, a schematic diagram of a training phase 300 of the second MLA 134 is illustrated in accordance with non-limiting embodiments of the present technology.

The second MLA 134 may be trained on a first set of training documents 310, each given training document 312 of the first set of training documents 310 being represented by a previously generated feature vector 314 and a label 316. The feature vector 314 may include a plurality of dimensions corresponding to a plurality of features (not depicted), which may be ranking features that may be used for ranking documents on the search engine server 140, such as document-specific features, query-independent features, and in some embodiments, query dependent features. As a non-limiting example, the feature vector 314 may contain an indication of a number of past queries having been used to access the given training document 312 on the search engine server 140, a respective past ranking of the given training document 312 by the search engine server 140 in response to a respective query, as well as associated respective past user interactions with the given training document 312.

The label 316 may be generated by a MLA (i.e. based on past user interactions) or may be determined by human assessors (e.g. on a scale of 1 to 5).

The second MLA 134 may then be trained on the first set of training documents 310 to generate a value parameter 326 for a given training document 312 based on the feature vector 314, and the label 316 of the given training document 312.

After the training phase, the second MLA 134 may compute a value parameter 326 for a given fresh document (not depicted) that does not have any past user interactions, such as a recently crawled document of the plurality of digital documents 117 stored in the preindexing database 138.

Figure 5:
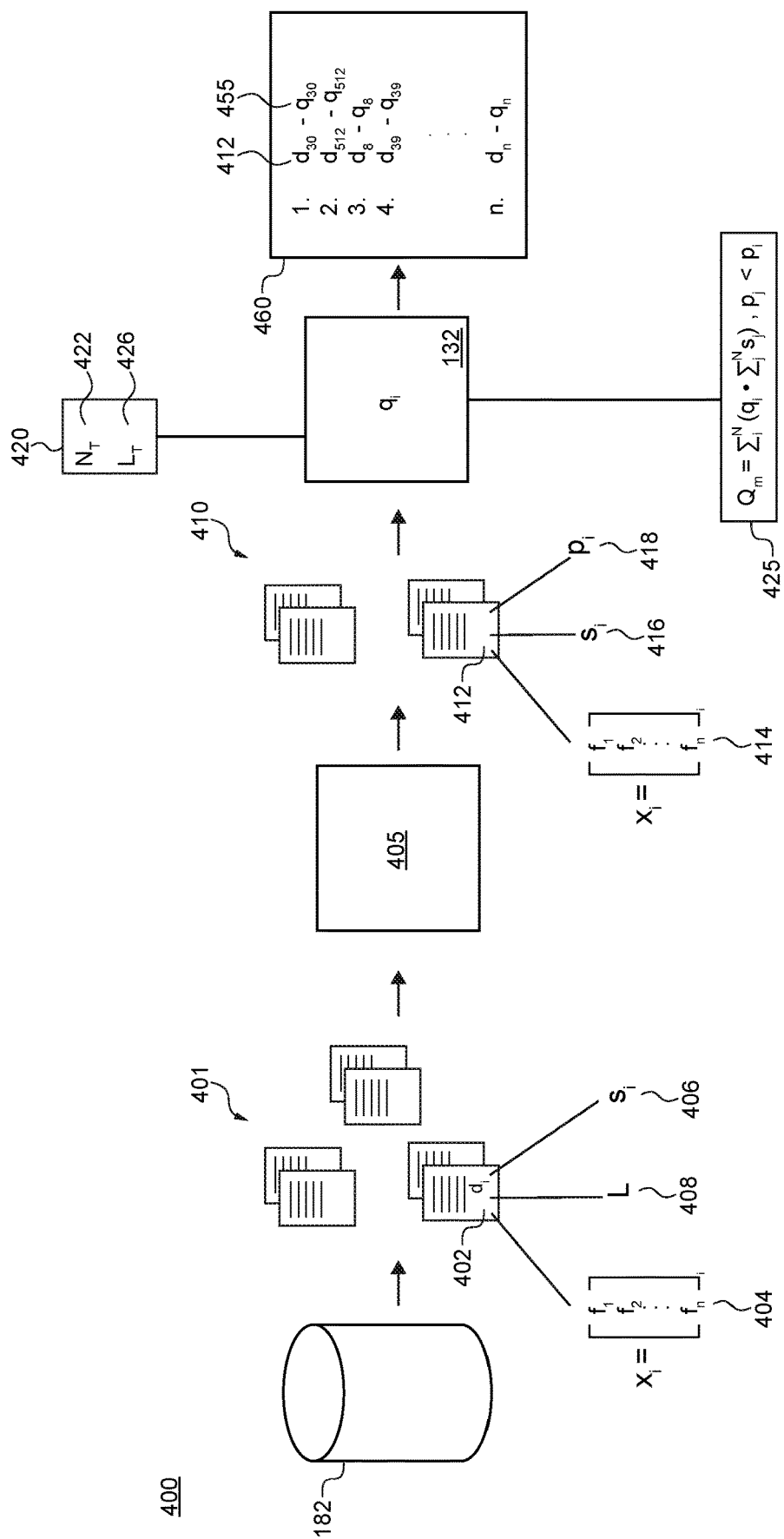
FIG. 5 depicts a schematic representation of a training phase of the first MLA processed by the system of FIG. 2 in accordance with non-limiting embodiments of the present technology.

With reference to FIG. 5, a schematic diagram of a training phase 400 of the first MLA 132 is depicted in accordance with non-limiting embodiments of the present technology.

In the embodiment illustrated herein, the first MLA 132 implements a LambdaMART algorithm for ranking documents. In alternative embodiments, the first MLA 132 may implement any listwise ranking algorithm, which may be modified for the purpose of the present technology.

LambdaMART Algorithm

The LambdaMART algorithm is inspired by the LambdaRank algorithm, but is based on a family of tree models called multiple additive regression trees (MART). The LambdaRank algorithm is itself based on the RankNet ranking algorithm.

Briefly speaking, RankNet uses gradient descent, which requires calculation of a gradient, where the output model needs to be a differentiable function (i.e. a derivative must exist at each point in its domain). RankNet is a pairwise approach using gradient descent to update model parameters in order to minimize a cost function (e.g. Cross-Entropy). To update the model, a gradient of the cost with respect to the model parameters is specified, which requires the gradient of the cost with respect to the model scores. RankNet defines a lambda gradient, which is the gradient of the cost function with respect to the score of a document. The lambda gradient may be interpreted as force having a magnitude and a direction, which moves documents up and down in the ranked list. Generally, another cost function or evaluation metric may be used for evaluating a final ranking quality (e.g. nDCG, MRR, MAP, and the like).

LambdaRank is based on RankNet and uses gradient descent, but each step is scaled by the change of a final metric (e.g. a change in one of the nDCG metric, MRR metric, MAP metric, and the like), which has been shown to speed and accuracy improvement over RankNet.

MART is a class of boosting algorithms performing gradient descent using regression trees. MART allows finding an ensemble of tress, which when added together minimize a cost function. However, since the cost functions generally used are not differentiable at all points, they cannot be used for gradient boosting, because gradients are required at each training point.

LambdaMART combines LambdaRank and MART, and uses a cascade of trees, where a gradient is computed after each new tree, to estimate the direction that minimizes the cost function, which will be scaled by the contribution of the next tree. Each tree thus contributes to a gradient step in the direction that minimizes the cost function. The output is an ensemble of gradient boosting trees, where the gradient is replaced by the lambda (gradient computed given the candidate pairs). Empirically, it has been shown that LambdaMART has been applied successfully to directly optimize metrics such as NDCG, MAP, and MRR.

The first MLA 132 may implement a modified LambdaMART algorithm to build a boosted tree ensemble to rank the plurality of digital documents 117.

In the context of the present technology, the first MLA 132 may implement the modified LambdaMART algorithm to directly maximize a utility function 425 represented by equation (6), instead of a cost function to minimize:

$$Q_m = \sum_i^N \left( q_i \cdot \sum_j^M s_j \right), p_j < p_i \qquad (6)$$

where: $Q_m$ is a cumulative quality value parameter, $q_i$ is the quality value parameter of the ith document in the plurality of digital documents 117, $s_j$ is a respective size of a jth document in the plurality of digital documents 117, $p_i$ is a value parameter of the ith document in the plurality of digital documents 117, $p_j$ is a value parameter of the jth document in the plurality of digital documents 117, N is a number of documents in the plurality of digital documents 117, and M is a number of documents in a given subset of documents having the value parameter $p_j$ below the value parameter $p_i$ of the ith document in the plurality of digital documents 117.

In some embodiments, the given subset of documents may consist of all documents in the plurality of digital documents 117 having a value parameter $p_j$ below the value parameter $p_i$. In alternative embodiments, the given subset of documents may consists of only specifically selected document having a value parameter $p_j$ below the value parameter $p_i$, such as a predetermined numbers of documents having the value parameter $p_j$ below the value parameter $p_i$.

In some embodiments, a weight $w_i$ for the quality value parameter $q_i$ and a weight $w_j$ for the size $s_j$ may be introduced in equation (6) to weigh documents that may be considered more "important" to the search engine server 140

(such weights may be selected manually, or derived as an example by another MLA, by analyzing the search log database 144), resulting in:

$$Q_m = \sum_i^N \left( w_i q_i \cdot \sum_j^M w_j s_j \right), p_j < p_i \quad (7)$$

where: $Q_m$ is a cumulative quality value parameter, $w_i$ is the respective weight associated with the quality value parameter $q_i$, $q_i$ is the quality value parameter of the $i^{th}$ document in the plurality of digital documents 117, $w_j$ is the respective weight associated with the respective size; $s_j$ is a respective size of a $j^{th}$ document in the plurality of digital documents 117, $p_i$ is a value parameter of the $i^{th}$ document in the plurality of digital documents 117, $p_j$ is a value parameter of the $j^{th}$ document in the plurality of digital documents 117, N is a number of documents in the plurality of digital documents 117, and M is a number of documents in a given subset of documents having the value parameter $p_j$ below the value parameter $p_i$ of the $i^{th}$ document in the plurality of digital documents 117.

The first MLA 132 implementing the LambdaMART algorithm may be initialized with a plurality of parameters 420, the plurality of parameters including: a number of trees 422, and a number of leaves per tree 426. In some embodiments, the plurality of parameters 420 may include more parameters, depending on how the first MLA 132 is implemented.

Generally speaking, to train the first MLA 132 implementing the LambdaMART algorithm, an objective function needs to be defined, and a derivative of the objective function weighted by the difference in the utility function when documents in a pair are swapped may be used as the lambda gradient.

Training Documents

A training document generator 405 may acquire from the training database 182 a plurality of training documents 401, and select a given training document 402 of the plurality of training documents 401 for inclusion in a second set of training documents 410, which may be used to train the first MLA 132 to predict a quality value parameter 455 of a given training document 412 of the second set of training documents 410. The given training document of the plurality of training documents 401 may be represented by a respective feature vector 404, a respective size 406, and a respective value parameter 408. The respective feature vector 404 may be the same feature vector used to compute the value parameter 408, or a feature vector including less, or more features. Generally speaking, the plurality of training documents 401 have been previously processed by the second MLA 134 to compute the value parameter 408.

The manner in which the second set of training documents 410 is chosen or generated by the training document generator 405 is not limited.

Figure 6:
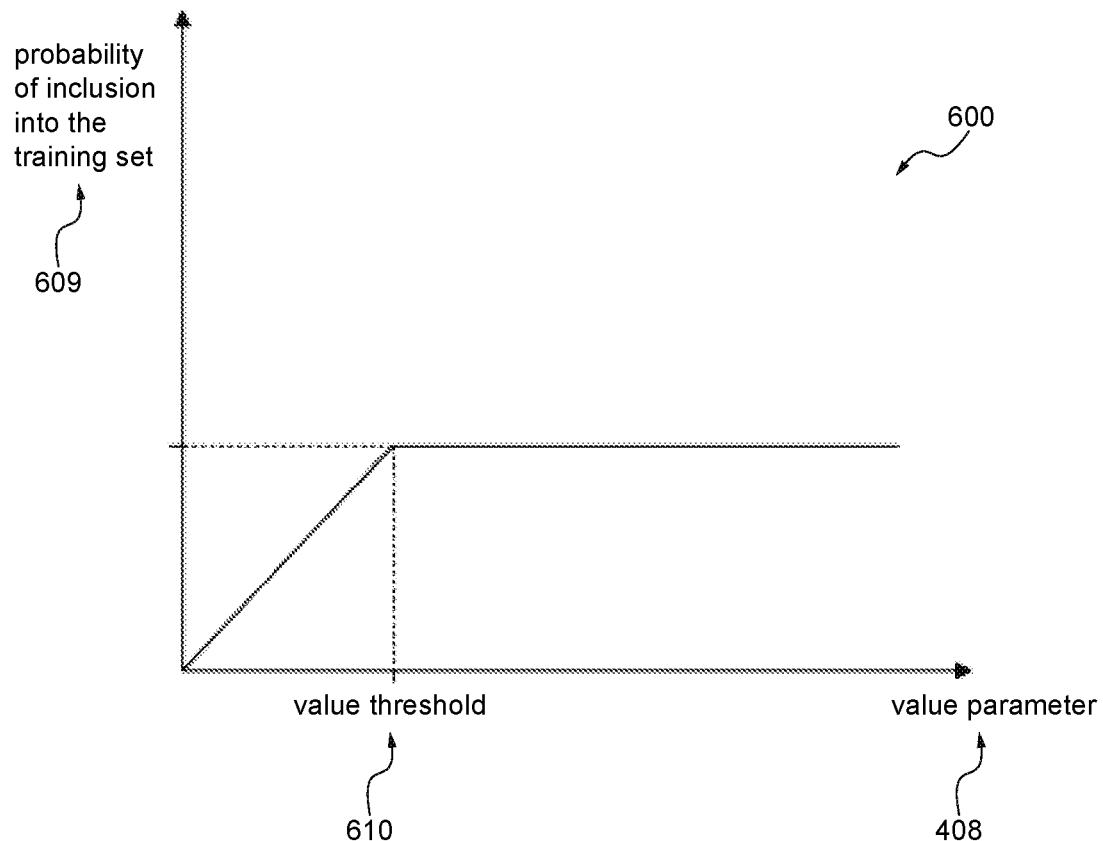
FIG. 6 depicts a schematic representation of a probability of inclusion of a document in a set of documents with respect to user interactions with the document in accordance with non-limiting embodiments of the present technology.

As a non-limiting example, with reference to FIG. 6, there is depicted a plot of a probability of inclusion of a given training document 402 of the plurality of training documents 401 in the second set of training documents 410, with respect to the value parameter 408 with the given training document 402. The higher the user interactions with the given training document 402 in the plurality of training documents 401, the higher the probability of inclusion of a given training document 402 in the second set of training documents 410. Additionally or alternatively, the inclusion of the given training document 402 from the plurality of training documents 401 into the second set of training documents 410 may be based on a predetermined value threshold 610, and the given training document 402 from the plurality of training documents 401 may be automatically included into the second set of training documents 410 if the value parameter 408 is above the predetermined value threshold 610. In some embodiments, the value parameter 408 computed by the second MLA 134, may be replaced by user interactions (or a combination thereof) present in the feature vector 404 that have been tracked by the analytics server 160 and stored in the user interaction log 148.

The first MLA 132 may receive as an input the second set of training documents 410, a given training document 412 being associated with a respective feature vector 414, a respective size 416, and respective value parameter 418. The first MLA 132 may learn, based on the second set of training documents 410 and the utility function 425, a ranking model that assigns a quality value parameter $q_i$ 455 to the given training document 412 based on the feature vector 414 and the size 416 of the training document 412, and may rank the first set of training documents 410 to obtain a ranked list of training documents 460, where documents with higher quality value parameters have a higher rank.

In the present embodiment and for the purpose of the present technology, the LambdaMART algorithm implemented by the first MLA 132 may not perform ranking of the second set of training documents 410 with respect to a query, which is usually the case with ranking algorithms. Thus, the first MLA 132 may not take into account queries for ranking, as well as query dependent features in feature vectors 414 of the second set of training documents 410.

In alternative embodiments, the first MLA 132 may take into account queries and query dependent features in feature vectors 414, as some queries may be more popular with users of the search engine server 140, and documents with terms of such popular queries may be accessed more often, and may be taken into account. Additionally or alternatively, the first MLA 132 may take into account statistics such as number of different queries having been used to access the given training document 412, and associated user interactions, without directly taking into account queries for ranking.

The number and type of features in the feature vector 414 is not limited. As a non-limiting example, the feature vector 414 may include the following query independent features:
  Web graph: connectivity in the web graph, such as number of inlinks and outlinks. Examples include: PageRank, Hyperlink-Induced Topic Search (HITS).
  Document statistics: basics statistics of the document, such as a number of words in the document, number of words in a documents in-link anchor text, number of mirror copies of the document, type of encoding, and the like.
  Characteristics of the URL: URL characteristics such as depth, number of visits, number of logins, number of dashes in the URL, and the like.
  Type of content: a category associated with the document, such as news type, encyclopedia article, official site, and the like.
  Clicks: click based features, such as click distance, probability of click, first click, last click, long dwell time click or only click, probability of skip (not clicked, but a document below is), average dwell time, and the like.
  Time: time based features, such as creation time of the document, modification time of the document, and the like.

The features in the feature vector 414 may be binary, counts and/or continuous.

The first MLA 132 may perform a plurality of rounds of training on the second set of training documents 410 to generate an optimal ranking function that maximizes the utility function 425. Each round of training may result in a different ranked list of training documents 460, and the results may be compared by applying the utility function 425, which evaluates a cumulative quality value parameter of the ranking. A given function that maximizes the cumulative quality value parameter may be chosen for the in-use phase 200. Additionally or alternatively, it may be possible to apply another type of metric to the ranked list of training documents 460 to evaluate a quality of the ranking.

Generally speaking, ranking may be performed by the first MLA 132 such that for any given selected subset of the ranked list of training documents 460, the ranking is optimal with regard to the value parameters and the sizes of the documents.

Figure 7:
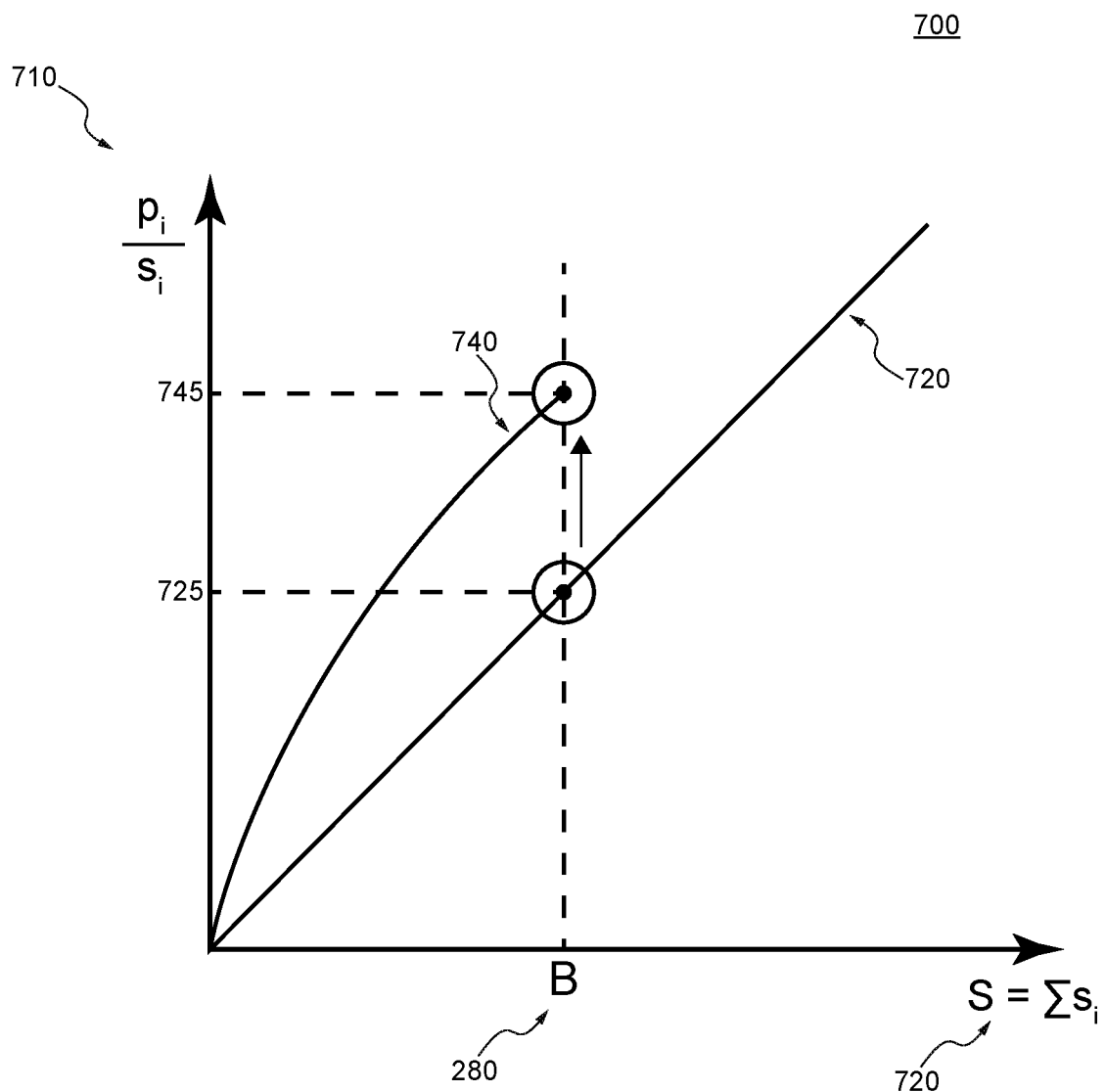
FIG. 7 depicts a schematic representation of a total quality value of a list of documents with respect to a total size of the list of documents in accordance with non-limiting embodiments of the present technology.

As a non-limiting example, with reference to FIG. 7, there is depicted a plot of a cumulative quality value parameter of a list of documents (not depicted) with respect to a total size 715 of list of documents 260 in accordance with non-limiting embodiments of the present technology. Function 720 may represent an approach with a non-optimized collection of documents, where the total quality value parameter grows linearly with the total size of the list of documents. Function 740 may represent the optimized ranking function of the first MLA 132, which is a non-linear function. As such, for a similar size (which may be as an example the available size of the search index 280), function 740 results in a higher cumulative quality value parameter 745 than the cumulative quality value parameter 725 of the function 720.

Figure 8:
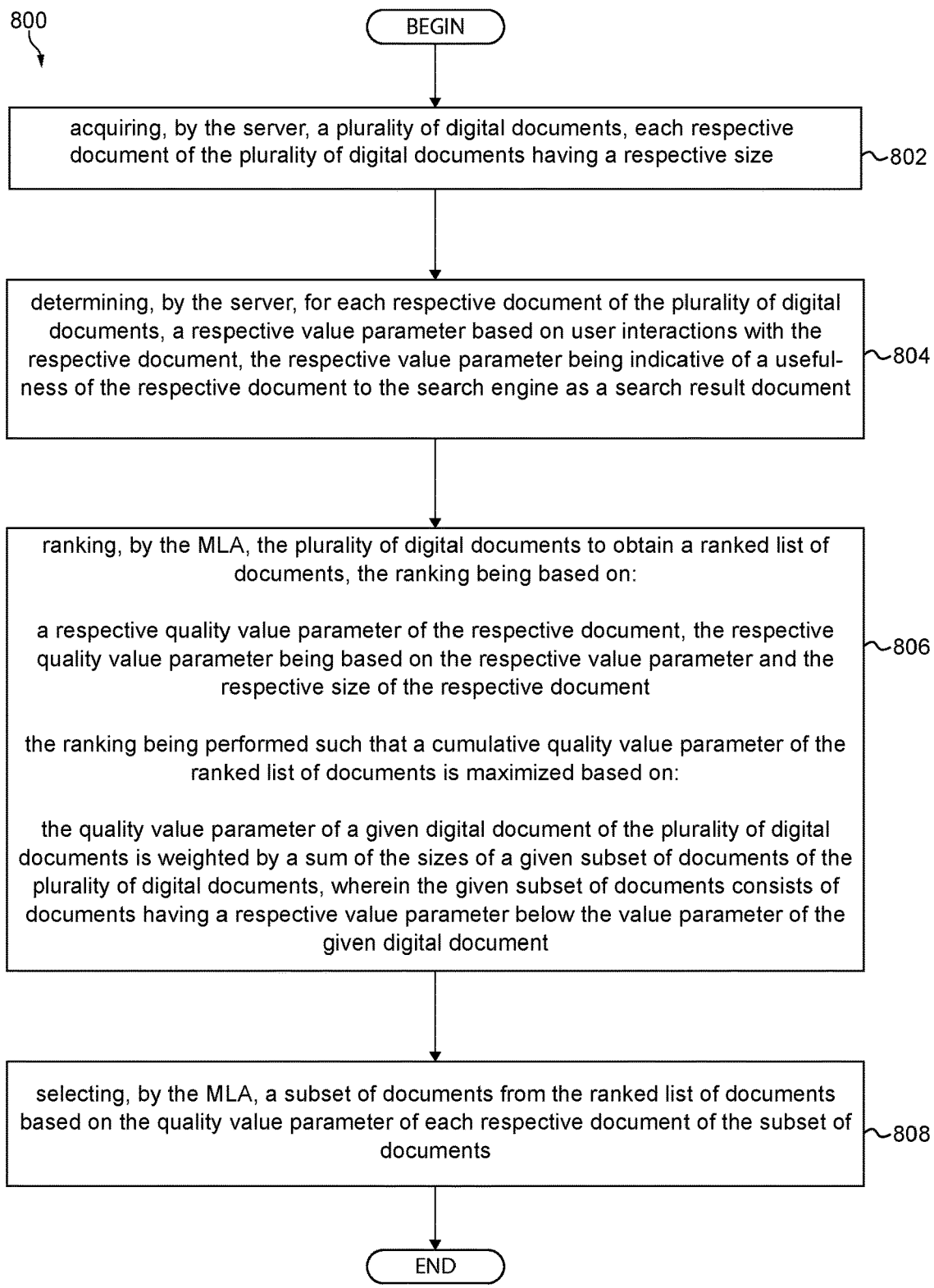
FIG. 8 depicts a flowchart of a method for selecting a subset of documents from a plurality of digital documents for inclusion in the search index of the search engine server of FIG. 2 in accordance with non-limiting embodiments of the present technology.

Now turning to FIG. 8, a flowchart of a method 800 for selecting a subset of 275 documents out of a plurality of digital documents 117 for inclusion in the search index 146 of the search engine server 140 is depicted according to non-limiting embodiments of the present technology.

The method 800 may be executed by the indexing server 120 of the system 100. In other embodiments, the method 800 may be executed by the search engine server 140. In alternative embodiments, the method 800 may be executed by a single server implementing the functionality of the search engine server 140 and the indexing server 120.

The method 800 may begin at step 802.

STEP 802: acquiring, by the server, a plurality of digital documents, each respective document of the plurality of digital documents having a respective size At step 802, the indexing server 120 may acquire a plurality of digital documents 117 from the preindexing database 138, a given digital document 212 having a size 216 and being associated with a feature vector 214 of the given digital document 212. In some embodiments, the given digital document 212 may be an indication of the given digital document 212, and may be associated with the size 216 and the feature vector 214 of the given digital document 212.

The method 800 may then advance to step 804.

STEP 804: determining, by the server, for each respective document of the plurality of digital documents, a respective value parameter based on user interactions with the respective document, the respective value parameter being indicative of a usefulness of the respective document to the search engine as a search result document At step 804, the second MLA 134 may determine, for each given digital document 212 of the plurality of digital documents 117, a value parameter 218, the value parameter 218 being indicative of a usefulness of the given digital document 212 to the search engine server 140 as a search result document. The value parameter 218 may be computed based at least partially on past user interactions with the given digital document 212, or may be computed based on predicted user interactions with the given digital document 212. In some embodiments, the value parameter 218 may be computed by the first MLA 132.

The method 800 may then advance to step 806.

STEP 806: ranking, by the MLA, the plurality of digital documents to obtain a ranked list of documents, the ranking being based on:

a respective quality value parameter of the respective document, the respective quality value parameter being based on the respective value parameter and the respective size of the respective document, the ranking being performed such that a cumulative quality value parameter of the ranked list of documents is maximized based on:

the quality value parameter of a given digital document of the plurality of digital documents is weighted by a sum of the sizes of a given subset of documents of the plurality of digital documents, wherein the given subset of documents consists of documents having a respective value parameter below the value parameter of the given digital document At step 806, the first MLA 132 of the indexing server 120 may compute for each given digital document 212 of the plurality of digital documents 117, a respective quality value parameter 255 based on the value parameter 218 and the size 216 of the given digital document 212. The first MLA 132 may then rank the plurality of digital documents 117 according to the quality value parameters 255 to obtain a ranked list of documents 260. The first MLA 132 has been trained to rank documents such that a cumulative quality value parameter of the ranked list of documents 260 is maximized based on: the quality value parameter of the given digital document 212 of the plurality of digital documents 117 is weighted by a sum of the sizes of a given subset of documents of the plurality of digital documents 117, wherein the given subset of documents consists of documents having a respective value parameter below the value parameter of the given digital document. In some embodiments, the respective quality value parameter 255 may be based at least partially on a ratio of the value parameter 218 to the size 216 of the given digital document 212. In other embodiments, the given subset of documents consists of all documents having a respective value parameter below the value parameter 218 of the given digital document 212. In some embodiments, the first MLA 132 may implement a modified LambdaMART ranking algorithm. In alternative embodiments, the first MLA 132 may implement a listwise ranking algorithm.

In some embodiments, the first MLA 132 has been trained to maximize the cumulative quality value parameter based on:

$$Q_m = \sum_i^N \left( q_i \cdot \sum_j^M s_j \right), p_j < p_i \qquad (6)$$

where:

Q is the cumulative quality value parameter;

$q_i$ is the respective value parameter of the respective $i^{th}$ document in the plurality of digital documents;

$s_j$ is the respective size of the respective $j^{th}$ document in the subset of documents;

$p_i$ is the respective quality value parameter of the $i^{th}$ document in the plurality of digital documents;

$p_j$ is the respective quality value parameter of the $j^{th}$ document in the plurality of digital documents N is a number of documents in the plurality of digital documents; and M is a number of documents in the given subset of documents.

In other embodiments, the first MLA 132 has been trained to maximize the cumulative quality value parameter based on:

$$Q_m = \sum_i^N \left( w_i q_i \cdot \sum_j^M w_j s_j \right), p_j < p_i \quad (7)$$

wherein:

$Q_m$ is the cumulative quality value parameter;

$w_i$ is a respective weight associated with the respective value parameter;

$q_i$ is the respective value parameter of the respective $i^{th}$ in the plurality of digital documents;

$w_j$ is a respective weight associated with the respective size;

$s_j$ is the respective size of the respective $j^{th}$ document in the subset of documents;

$p_i$ is the respective quality value parameter of the $i^{th}$ document in the plurality of digital documents;

$p_j$ is the respective quality value parameter of the $j^{th}$ document in the plurality of digital documents N is a number of documents in the plurality of digital documents; and M is a number of documents in the given subset of documents.

In some embodiments,

The method 800 may then advance to step 806.

STEP 808: selecting, by the MLA, a subset of documents from the ranked list of documents based on the quality value parameter of each respective document of the subset of documents At step 808, the selector 270, may select a subset 275 of the ranked list of documents 260 for inclusion in the search index 146, based on the quality value parameter 255 of each respective document of the subset of documents 275. In some embodiments, the selector 270 may select the subset 275 of the ranked list of documents 260 for inclusion in the search index 146 based on a total size or available size 280 of the search index 146. In alternative embodiments, the first MLA 132 may perform the selection of the subset 275.

The method 800 may then end.

It should be apparent to those skilled in the art that at least some embodiments of the present technology aim to expand a range of technical solutions for addressing a particular technical problem, namely It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for selecting documents for inclusion into a search index of a search engine, the search engine implemented by a server, the server executing a machine learning algorithm (MLA), the MLA having been trained to rank documents based on size and user interactions with the documents, the method executable by the server, the method comprising:

acquiring, by the server, a plurality of digital documents, each respective document of the plurality of digital documents having a respective size;

determining, by the server, for each respective document of the plurality of digital documents, a respective value parameter based on user interactions with the respective document, the respective value parameter being indicative of a usefulness of the respective document to the search engine as a search result document;

ranking, by the MLA, the plurality of digital documents to obtain a ranked list of documents, the ranking being based on:

a respective quality value parameter of the respective document, the respective quality value parameter being based on the respective value parameter and the respective size of the respective document, the ranking being performed such that a cumulative quality value parameter is maximized based on:

the quality value parameter of a given digital document of the ranked list of documents weighted by a sum of the sizes of a given subset of documents of the plurality of digital documents, wherein the given subset of documents consists of documents having a respective value parameter below the value parameter of the given digital document in the plurality of digital documents according to:

$$Q_m = \sum_i^N \left( q_i \cdot \sum_j^M s_j \right), p_j < p_i$$

wherein:

Q is the cumulative quality value parameter;

$q_i$ is the respective value parameter of the respective $i^{th}$ document in the plurality of digital documents;

$s_j$ is the respective size of the respective $j^{th}$ document in the subset of documents;

$p_i$ is the respective quality value parameter of the $i^{th}$ document in the plurality of digital documents;

$p_j$ is the respective quality value parameter of the $j^{th}$ document in the plurality of digital documents;

N is a number of documents in the plurality of digital documents; and

M is a number of documents in the given subset of documents;

selecting, by the MLA, a subset of documents from the ranked list of documents based on the quality value parameter of each respective document of the subset of documents; and storing, by the server, the subset of documents in the search index.

2. The method of claim 1, wherein the given subset consists of all documents having a respective value parameter below the value parameter of the given digital document.

3. The method of claim 2, wherein the user interactions are at least one of: predicted user interactions with the respective document, and past user interactions with the respective document.

4. The method of claim 3, wherein a rank of a respective document in the ranked list of documents is based at least partially on a ratio of the respective value parameter to the respective size of the respective document.

5. The method of claim 4, wherein the selecting is further based on:
a sum of the respective sizes of the documents in the subset of documents being below a predetermined threshold size.

6. The method of claim 5, wherein the predetermined threshold size is an available storage size of the search index of the search engine.

7. The method of claim 6, wherein the subset of documents selected from the ranked list of documents comprises a number of O top ranked documents that fit within the search index of the search engine.

8. The method of claim 1, wherein the MLA has been trained to rank documents using a LambdaMART algorithm.

9. The method of claim 1, wherein the MLA has been trained to rank documents using a listwise ranking algorithm.

10. The method of claim 1, wherein the ranking comprises maximizing the cumulative quality value parameter based on:

$$Q_m = \sum_i^N \left( w_i \cdot q_i \cdot \sum_j^M w_j \cdot s_j \right), p_j < p_i$$

wherein:
$Q_m$ is the cumulative quality value parameter;
$w_i$ is a respective weight associated with the respective value parameter;
$q_i$ is the respective value parameter of the respective $i^{th}$ in the plurality of digital documents;
$w_j$ is a respective weight associated with the respective size;
$s_j$ is the respective size of the respective $j^{th}$ document in the subset of documents;
$p_i$ is the respective quality value parameter of the $i^{th}$ document in the plurality of digital documents;

$p_j$ is the respective quality value parameter of the $j^{th}$ document in the plurality of digital documents;
N is a number of documents in the plurality of digital documents; and
M is a number of documents in the given subset of documents.

11. The method of claim 1, wherein the computing the respective value parameter of the respective document is performed using a second MLA executed by the server.

12. A system for selecting documents for inclusion into a search index of a search engine, the search engine implemented by the system, the system executing a machine learning algorithm (MLA),
the MLA having been trained to rank documents based on size and user interactions with the documents,
the system comprising:
a processor;
a non-transitory computer-readable medium comprising instructions, the processor,
upon executing the instructions, being configured to:
acquire a plurality of digital documents, each respective document of the plurality of digital documents having a respective size;
determine for each respective document of the plurality of digital documents, a respective value parameter based on user interactions with the respective document, the respective value parameter being indicative of a usefulness of the respective document to the search engine as a search result document;
rank, by the MLA, the plurality of digital documents to obtain a ranked list of documents, the ranking being based on:
a respective quality value parameter of the respective document, the respective quality value parameter being based on the respective value parameter and the respective size of the respective document,
the ranking being performed such that a cumulative quality value parameter is maximized based on:
the quality value parameter of a given digital document of the ranked list of documents weighted by a sum of the sizes of a given subset of documents of the plurality of digital documents, wherein the given subset of documents consists of documents having a respective value parameter below the value parameter of the given digital document in the plurality of digital documents according to:

$$Q_m = \sum_i^N \left( q_i \cdot \sum_j^M s_j \right), p_j < p_i$$

wherein:
Q is the cumulative quality value parameter;
$q_i$ is the respective value parameter of the respective $i^{th}$ document in the plurality of digital documents;
$s_j$ is the respective size of the respective $j^{th}$ document in the subset of documents;
$p_i$ is the respective quality value parameter of the $i^{th}$ document in the plurality of digital documents;

$p_j$ is the respective quality value parameter of the $j^{th}$ document in the plurality of digital documents;

N is a number of documents in the plurality of digital documents; and

M is a number of documents in the given subset of documents;

select, by the MLA, a subset of documents from the ranked list of documents based on the quality value parameter of each respective document of the subset of documents; and store the subset of documents in the search index.

13. The system of claim 12, wherein the given subset consists of all documents having a respective value parameter below the value parameter of the given digital document.

14. The system of claim 13, wherein the user interactions are at least one of: predicted user interactions with the respective document, and past user interactions with the respective document.

15. The system of claim 14, wherein a rank of a respective document in the ranked list of documents is based at least partially on a ratio of the respective value parameter to the respective size of the respective document.

16. The system of claim 15, wherein the selecting is further based on:

a sum of the respective sizes of the documents in the subset of documents being below a predetermined threshold size.

17. The system of claim 16, wherein the predetermined threshold size is an available storage size of the search index of the search engine.

18. The system of claim 17, wherein the subset of documents selected from the ranked list of documents comprises a number of O top ranked documents that fit within the search index of the search engine.

19. The system of claim 12, wherein the MLA has been trained to rank documents using a LambdaMART algorithm.

20. The system of claim 12, wherein the MLA has been trained to rank documents using a listwise ranking algorithm.

21. The system of claim 12, wherein the ranking comprises maximizing the cumulative quality value parameter based on:

$$Q_m = \sum_i^N \left( w_i \cdot q_i \cdot \sum_j^M w_j \cdot s_j \right), p_j < p_i$$

wherein:

$Q_m$ is the cumulative quality value parameter;

$w_i$ is a respective weight associated with the respective value parameter;

$q_i$ is the respective value parameter of the respective $i^{th}$ in the plurality of digital documents;

$w_j$ is a respective weight associated with the respective size;

$s_j$ is the respective size of the respective $j^{th}$ document in the subset of documents;

$p_i$ is the respective quality value parameter of the $i^{th}$ document in the plurality of digital documents;

$p_j$ is the respective quality value parameter of the $j^{th}$ document in the plurality of digital documents;

N is a number of documents in the plurality of digital documents; and

M is a number of documents in the given subset of documents.

22. The system of claim 12, wherein the computing the respective value parameter of the respective document is performed using a second MLA executed by the system.

* * * * *